US011388728B2

(12) United States Patent
Xue et al.

(10) Patent No.: US 11,388,728 B2
(45) Date of Patent: Jul. 12, 2022

(54) CHANNEL AVAILABILITY PROTOCOL IN A SHARED SPECTRUM

(71) Applicant: QUALCOMM incorporated, San Diego, CA (US)

(72) Inventors: Yisheng Xue, San Diego, CA (US); Xiaoxia Zhang, San Diego, CA (US); Aleksandar Damnjanovic, Del Mar, CA (US); Weiliang Zeng, San Diego, CA (US); Tamer Kadous, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 16/190,927

(22) Filed: Nov. 14, 2018

(65) Prior Publication Data

US 2019/0182845 A1    Jun. 13, 2019

Related U.S. Application Data

(60) Provisional application No. 62/596,638, filed on Dec. 8, 2017.

(51) Int. Cl.
*H04W 72/08* (2009.01)
*H04L 5/00* (2006.01)
(Continued)

(52) U.S. Cl.
CPC ........... *H04W 72/085* (2013.01); *H04L 5/006* (2013.01); *H04L 5/0023* (2013.01);
(Continued)

(58) Field of Classification Search
CPC ........... H04W 72/085; H04W 74/0808; H04W 74/0833; H04W 16/14; H04W 72/082;
(Continued)

(56) References Cited

U.S. PATENT DOCUMENTS

| 10,924,222 | B2 * | 2/2021 | Sun | ........................ H04L 1/1819 |
| 2009/0036059 | A1 * | 2/2009 | Wu | ........................ H04B 17/336 |
| | | | | 455/67.13 |

(Continued)

FOREIGN PATENT DOCUMENTS

| CN | 101345579 A | 1/2009 |
| WO | WO-2016197315 A1 | 12/2016 |

OTHER PUBLICATIONS

International Search Report and Written Opinion—PCT/US2018/061193—ISA/EPO—dated Jan. 30, 2019.

*Primary Examiner* — Christopher P Grey
(74) *Attorney, Agent, or Firm* — Holland & Hart LLP/Qualcomm

(57) ABSTRACT

Methods, systems, and devices for wireless communications are described. A transmitter may identify a contention window for a no-energy-detection protocol for determining a channel availability for a data transmission. After the contention window expires, the transmitter may send a request message to a receiver. The receiver may measure a quality of the request message against a request threshold and transmit a response message if the measured quality exceeds the request threshold. The transmitter may then measure a quality of the response message against a response threshold. If the measured quality exceeds the response threshold, the transmitter may initiate a data transmission with the receiver. If the quality falls below the response threshold or the response message is not received, the transmitter may adjust the contention window and reattempt the no-energy-detection protocol. The contention window may also be adjusted based on an acknowledgement message received after the data transmission.

23 Claims, 18 Drawing Sheets

(51) Int. Cl.
*H04W 74/08* (2009.01)
*H04W 16/14* (2009.01)

(52) U.S. Cl.
CPC .......... *H04L 5/0055* (2013.01); *H04W 16/14* (2013.01); *H04W 72/082* (2013.01); *H04W 74/0808* (2013.01); *H04W 74/0833* (2013.01)

(58) Field of Classification Search
CPC ... H04L 5/0023; H04L 5/0055; H04L 5/0094; H04L 5/0044; H04L 5/006
See application file for complete search history.

(56) References Cited

U.S. PATENT DOCUMENTS

| | | | |
|---|---|---|---|
| 2013/0235721 A1* | 9/2013 | Nguyen | H04W 74/0841 370/230 |
| 2014/0328270 A1* | 11/2014 | Zhu | H04W 74/002 370/329 |
| 2016/0037557 A1* | 2/2016 | Gu | H04W 74/02 370/338 |
| 2016/0057770 A1* | 2/2016 | Yerramalli | H04W 74/08 370/329 |
| 2016/0345326 A1* | 11/2016 | Yerramalli | H04W 76/28 |
| 2017/0048916 A1* | 2/2017 | Yoo | H04B 17/318 |
| 2017/0086225 A1 | 3/2017 | Ljung | |
| 2017/0230849 A1* | 8/2017 | Wei | H04L 5/0023 |
| 2017/0257863 A1* | 9/2017 | Ko | H04W 72/0446 |
| 2018/0160440 A1* | 6/2018 | Hosseini | H04L 5/0078 |
| 2018/0175975 A1* | 6/2018 | Um | H04L 1/1816 |
| 2020/0100119 A1* | 3/2020 | Byun | H04B 7/088 |

\* cited by examiner

CHANNEL AVAILABILITY PROTOCOL IN A SHARED SPECTRUM

CROSS REFERENCES

The present application for patent claims the benefit of U.S. Provisional Patent Application No. 62/596,638 by XUE, et al., entitled "CHANNEL AVAILABILITY PROTOCOL IN A SHARED SPECTRUM," filed Dec. 8, 2017, assigned to the assignee hereof, and which is expressly incorporated by reference herein.

BACKGROUND

The following relates generally to wireless communication, and more specifically to a channel availability protocol in a shared spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a base station and a UE operating in a shared spectrum may employ a procedure (e.g., a listen-before-talk (LBT) procedure) before initiating communications. In some cases, the procedure includes a type of energy-detection or hand-shake reservation (e.g., request to send/clear to send (RTS/CTS)) to determine the availability of the channel. But an energy-detection or hand-shake reservation may be expensive to implement and may have other disadvantages. More efficient techniques are desired for facilitating communication on a shared spectrum.

SUMMARY

The described techniques relate to improved methods, systems, devices, and apparatuses that support a channel availability protocol in a shared spectrum. Generally, the described techniques provide for identifying an initial contention window, transmitting a request message to request initiation of a data transmission after the contention window expires, receiving a response message, measuring a signal quality of the response message, and initiating the data transmission based on if the measured signal quality is above a response threshold. One or more acknowledgement messages may be received after the data transmission is initiated.

In some cases, a second contention window may be determined based on whether the measured signal quality falls below the response threshold, the response message is not received, or the one or more acknowledgement messages are not satisfactory. The second contention window may, in some cases, include a longer time duration than the initial contention window or fewer frequency resources than the initial contention window. After the second contention window expires, a second request message may be transmitted, and a second response message may be received. Accordingly, a second signal quality may be measured on the second response message, and the data transmission may be initiated if the measured signal quality is above the response threshold. Additional contention windows may be determined until a threshold value (e.g., a maximum time value or a minimum frequency value) is reached using the protocol. In some cases, the response message may be transmitted and received based on a measured signal quality of the request message. Moreover, the measured signal qualities of the request message and the response message may be measured independently of any energy detection.

A method of wireless communication at a transmitter is described. The method may include identifying a contention window including a first set of time-frequency resources, transmitting, to a receiver after the contention window expires, a request message to request initiation of a data transmission, receiving a message from the receiver in response to the request message, measuring a signal quality metric associated with the received message, and initiating the data transmission in a shared frequency spectrum band based on whether the signal quality metric measurement associated with the received message exceeds a response threshold.

An apparatus for wireless communication is described. The apparatus may include means for identifying a contention window including a first set of time-frequency resources; means for transmitting, to a receiver after the contention window expires, a request message to request initiation of a data transmission, means for receiving a message from the receiver in response to the request message, means for measuring a signal quality metric associated with the received message, and means for initiating the data transmission in a shared frequency spectrum band based on whether the signal quality metric measurement associated with the received message exceeds a response threshold.

Another apparatus for wireless communication is described. The apparatus may include a processor, memory in electronic communication with the processor, and instructions stored in the memory. The instructions may be operable to cause the processor to identify a contention window including a first set of time-frequency resources, transmit, to a receiver after the contention window expires, a request message to request initiation of a data transmission, receive a message from the receiver in response to the request message, measure a signal quality metric associated with the received message, and initiate the data transmission in a shared frequency spectrum band based on whether the signal quality metric measurement associated with the received message exceeds a response threshold.

A non-transitory computer-readable medium for wireless communication is described. The non-transitory computer-readable medium may include instructions operable to cause a processor to identify a contention window including a first set of time-frequency resources, transmit, to a receiver after the contention window expires, a request message to request initiation of a data transmission, receive a message from the receiver in response to the request message, measure a signal quality metric associated with the received message, and initiate the data transmission in a shared frequency spectrum band based on whether the signal quality metric measurement associated with the received message exceeds a response threshold.

Some examples of the method, apparatus, and non-transitory computer-readable medium described above may further include processes, features, means, or instructions for receiving one or more acknowledgment messages from the receiver within a transmission time interval based on initiating the data transmission.

In some examples of the method, apparatus, and non-transitory computer-readable medium described above, receiving a message from the receiver in response to the request message further includes waiting for the message from the receiver at a time indicated in the requested message.

Some examples of the method, apparatus, and non-transitory computer-readable medium described above may further include processes, features, means, or instructions for setting the contention window to the first set of time-frequency resources based on receiving satisfactory one or more acknowledgement messages from the receiver within a transmission time interval, the satisfactory one or more acknowledgement messages including an indication that an amount of code blocks for the initiated data transmission may have been correctly checked within the transmission time interval.

In some examples of the method, apparatus, and non-transitory computer-readable medium described above, the message from the receiver may be based on a measurement of a signal quality metric associated with the request message.

Some examples of the method, apparatus, and non-transitory computer-readable medium described above may further include processes, features, means, or instructions for determining, based on measuring the signal quality metric, a second contention window including a second set of time-frequency resources that may be different from the first set of time-frequency resources.

In some examples of the method, apparatus, and non-transitory computer-readable medium described above, a first size of the contention window and a second size of the second contention window may be the same.

Some examples of the method, apparatus, and non-transitory computer-readable medium described above may further include processes, features, means, or instructions for determining that one or more acknowledgement messages received from the receiver within a transmission time interval may be satisfactory, the satisfactory one or more acknowledgement messages including an indication that an amount of code blocks for the initiated data transmission may have been correctly checked within the transmission time interval, where determining the second contention window may be based on determining that the satisfactory one or more acknowledgement messages may have been received. Some examples of the method, apparatus, and non-transitory computer-readable medium described above may further include processes, features, means, or instructions for transmitting an additional request to the receiver using the second set of time-frequency resources based on determining that the satisfactory one or more acknowledgment messages may have been received.

Some examples of the method, apparatus, and non-transitory computer-readable medium described above may further include processes, features, means, or instructions for determining that the signal quality metric measurement does not exceed the response threshold or that the transmitter failed to receive the message from the receiver based on a time indicated in the request message, where determining the second contention window may be based on determining that the signal quality metric measurement does not exceed the response threshold or that the transmitter failed to receive the message.

Some examples of the method, apparatus, and non-transitory computer-readable medium described above may further include processes, features, means, or instructions for determining that one or more acknowledgement messages received from the receiver within a transmission time interval may be not satisfactory, the not satisfactory one or more acknowledgement messages including an indication that an amount of code blocks for the initiated data transmission may have not been correctly checked within the transmission time interval, where determining the second contention window may be based on determining that the not satisfactory one or more acknowledgment messages may have been received from the receiver.

In some examples of the method, apparatus, and non-transitory computer-readable medium described above, the second set of time-frequency resources includes a second number of time resources, the second number of time resources being greater than a first number of time resources in the first set of time-frequency resources.

Some examples of the method, apparatus, and non-transitory computer-readable medium described above may further include processes, features, means, or instructions for transmitting a second request message to the receiver after the second contention window expires. Some examples of the method, apparatus, and non-transitory computer-readable medium described above may further include processes, features, means, or instructions for receiving a second message from the receiver based on a second time indicated in the second request message. Some examples of the method, apparatus, and non-transitory computer-readable medium described above may further include processes, features, means, or instructions for measuring a second signal quality metric associated with the second message, the measuring being independent of an energy detection, where initiating the data transmission may be based on the second signal quality metric measurement exceeding the response threshold.

Some examples of the method, apparatus, and non-transitory computer-readable medium described above may further include processes, features, means, or instructions for determining that the second set of time-frequency resources may have not reached a maximum contention window time value. Some examples of the method, apparatus, and non-transitory computer-readable medium described above may further include processes, features, means, or instructions for determining a third contention window including a third set of time-frequency resources with a third number of time resources that may be greater than the second number of time resources of the second set of time-frequency resources based on determining that the second set of time-frequency resources may have not reached the maximum contention window time value.

In some examples of the method, apparatus, and non-transitory computer-readable medium described above, the second request message includes a second request initiation for the data transmission and an indication of frequency resources to be used for the data transmission, the frequency resources being fewer than an indication of frequency resources associated with the request message.

Some examples of the method, apparatus, and non-transitory computer-readable medium described above may further include processes, features, means, or instructions for transmitting the request message to a second receiver different from the receiver after transmitting the request message to the receiver.

In some examples of the method, apparatus, and non-transitory computer-readable medium described above, the request message includes an indication of the response threshold.

In some examples of the method, apparatus, and non-transitory computer-readable medium described above, the request message includes an identification of the receiver.

In some examples of the method, apparatus, and non-transitory computer-readable medium described above, the request message includes one length of a transmission time interval.

In some examples of the method, apparatus, and non-transitory computer-readable medium described above, the request message may be transmitted on a physical downlink control channel (PDCCH).

In some examples of the method, apparatus, and non-transitory computer-readable medium described above, the request message includes an indication of time-frequency resources for the data transmission.

Some examples of the method, apparatus, and non-transitory computer-readable medium described above may further include processes, features, means, or instructions for measuring the signal quality metric associated with the received message independent of an energy detection associated with the receiver.

In some examples of the method, apparatus, and non-transitory computer-readable medium described above, the signal quality metric associated with the received message includes a signal-to-noise ratio (SNR) or a signal-to-interference-plus-noise ratio (SINR) associated with the received message.

A method of wireless communication at a receiver is described. The method may include receiving a request message from a transmitter, where the request message includes a specified time to transmit a message, measuring a signal quality metric associated with the request message, transmitting the message at the specified time based on the signal quality metric measurement exceeding a request threshold associated with the request message, and receiving a data transmission from the transmitter in a shared frequency spectrum band in response to the transmitted message.

An apparatus for wireless communication is described. The apparatus may include means for receiving a request message from a transmitter, where the request message includes a specified time to transmit a message, means for measuring a signal quality metric associated with the request message, means for transmitting the message at the specified time based on the signal quality metric measurement exceeding a request threshold associated with the request message, and means for receiving a data transmission from the transmitter in a shared frequency spectrum band in response to the transmitted message.

Another apparatus for wireless communication is described. The apparatus may include a processor, memory in electronic communication with the processor, and instructions stored in the memory. The instructions may be operable to cause the processor to receive a request message from a transmitter, where the request message includes a specified time to transmit a message, measure a signal quality metric associated with the request message, transmit the message at the specified time based on the signal quality metric measurement exceeding a request threshold associated with the request message, and receive a data transmission from the transmitter in a shared frequency spectrum band in response to the transmitted message.

A non-transitory computer-readable medium for wireless communication is described. The non-transitory computer-readable medium may include instructions operable to cause a processor to receive a request message from a transmitter, where the request message includes a specified time to transmit a message, measure a signal quality metric associated with the request message, transmit the message at the specified time based on the signal quality metric measurement exceeding a request threshold associated with the request message, and receive a data transmission from the transmitter in a shared frequency spectrum band in response to the transmitted message.

Some examples of the method, apparatus, and non-transitory computer-readable medium described above may further include processes, features, means, or instructions for transmitting one or more acknowledgement messages to the transmitter based on receiving the data transmission.

In some examples of the method, apparatus, and non-transitory computer-readable medium described above, the data transmission may be based on a measurement of a signal quality metric associated with the transmitted message.

In some examples of the method, apparatus, and non-transitory computer-readable medium described above, the request threshold may be received in the request message.

In some examples of the method, apparatus, and non-transitory computer-readable medium described above, the request threshold may be received via a radio resource control (RRC) broadcast.

Some examples of the method, apparatus, and non-transitory computer-readable medium described above may further include processes, features, means, or instructions for measuring the signal quality metric associated with the request message independent of an energy detection.

In some examples of the method, apparatus, and non-transitory computer-readable medium described above, the signal quality metric associated with the request message includes an SNR or an SINR associated with the request message.

DETAILED DESCRIPTION

Figure 1:
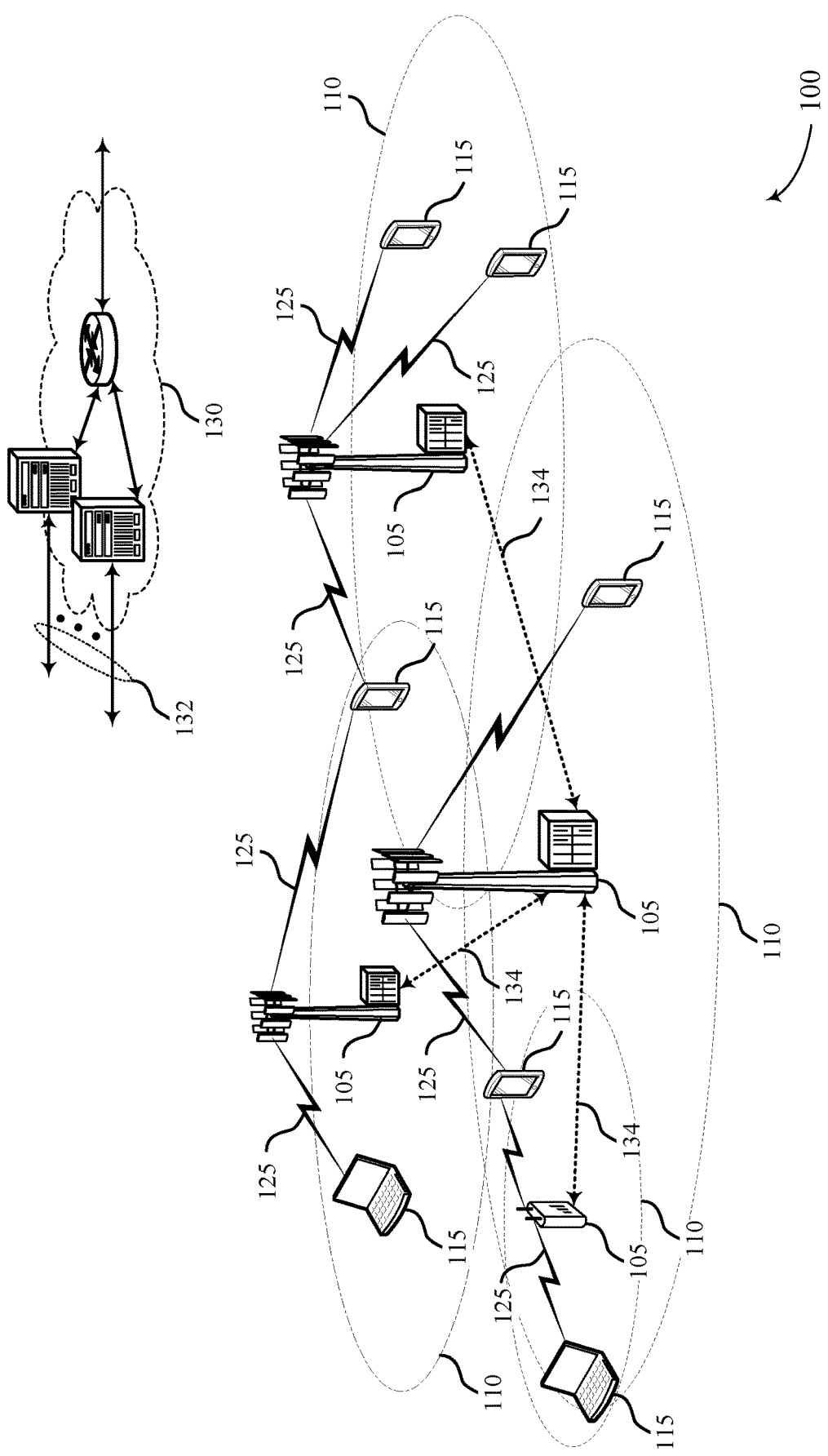
FIG. 1 illustrates an example of a system for wireless communication that supports a channel availability protocol in a shared spectrum in accordance with aspects of the present disclosure.

Some wireless communications systems (e.g., New Radio (NR)) may utilize a shared (e.g., unlicensed, licensed) spectrum for communication between a user equipment (UE) and a base station. Before establishing and initiating communications, the UE and base station may employ a protocol to determine the availability of a set of resources (i.e., a channel) and prevent interference with additional transmissions. For example, the additional transmissions may be between another UE and the base station, another UE and another base station, higher priority transmissions (e.g., radar), etc.

In some cases, the protocol may include a listen-before-talk (LBT) protocol that relies on energy detection, where the UE and base station "listen" to a channel to determine if ongoing transmissions are occurring on the channel before communicating on resources of the channel. If a transmission is detected, the UE and base station may start a back-off timer before attempting to access the same channel or another channel for communications. In order to detect the presence of a transmission, the LBT protocol may be based on an energy-detection, where the UE and base station determine a transmission is present on a channel based on sensing an amount of energy on or associated with the channel. Additionally or alternatively, the LBT protocol may include a hand-shaking reservation (e.g., request to send/clear to send (RTS/CTS)), where a first message requesting communications is transmitted and a second message indicating that the channel is clear to communicate is transmitted back. The hand-shaking reservation-based LBT protocol may further include the UE monitoring a broadcast reservation signal to determine the availability of a channel. The energy-detection and hand-shaking reservation techniques, however, may be expensive to implement and may include other shortcomings.

As described herein, techniques are provided to enable a no-energy-detection protocol for determining channel availability and facilitate communication between devices. A base station (e.g., a transmitter) may maintain a first contention window with an initial size (e.g., a minimum contention window size (cwMin)), where the initial size includes a first number of time resources and a first number of frequency resources. After waiting for the first number of time resources to expire (e.g., when the first contention window expires), the base station may transmit a request message (e.g., REQ message) to a UE (e.g., a receiver) to initiate a data transmission and wait for the UE to transmit a response message (e.g., RES message). The request message may indicate a specific time for the UE to transmit the response message. Additionally, the request message may include an indication of time-frequency resources that may be utilized for the data transmission.

Before transmitting the response message, the UE may measure a signal-to-interference-plus-noise ratio (SINR) (which may be an example of a signal quality metric) on the request message and determine if the decoding SINR on the request message is above a threshold associated with the request message (e.g., REQ-threshold). The threshold associated with the request message may be indicated in a broadcast radio resource control (RRC) message or in the transmitted request message, among other methods. If the SINR (e.g., a decoding SINR) measured on the request message is above the threshold associated with the request message, the UE may transmit the response message to the base station. Alternatively, if the SINR measured on the request message is below the threshold associated with the request message, the UE may refrain from transmitting the response message to the base station. As described herein, discussion of and examples related to an SINR, unless otherwise noted, also relate to a signal-to-noise ratio (SNR).

If the response message is received, the base station may then measure a decoding SINR on the response message and determine if the SINR on the response message is above a threshold associated with the response message (e.g., RES-threshold). In some cases, the threshold associated with the response message may be embedded in the request message or defined initially by the base station. If the SINR on the response message is above the threshold associated with the response message, the base station may initiate the data transmission with the UE. Alternatively, if the SINR on the response message is below the threshold associated with the response message or no response message is received (e.g., the UE refrains from transmitting the response based on the SINR measured on the request message being below the threshold associated with the request message), the base station may establish a second contention window and reattempt the no-energy-detection protocol with the UE after the second contention window expires. In some cases, the base station may determine that no response message is received based on waiting for the response message for a time that includes at least the specified time for the UE to transmit the response message in the request message.

To increase the chances of receiving a satisfactory response message (e.g., receiving a response message where the SINR measured on the response message is above the threshold associated with the response message), the second contention window may include more time resources than the first contention window (e.g., double the first number of time resources). Additionally or alternatively, the second contention window may include a subset of the first number of frequency resources (e.g., fewer frequency resources) within the first contention window. Each time the decoding SINR on the response message does not exceed the threshold associated with the response message or the response message is not received, the base station may establish a subsequent contention window with either an expanded number (e.g., doubled) of the time resources from the previously utilized contention window, or a reduced number of frequency resources from the previously utilized contention window, or a combination thereof. The base station may continue adjusting the size of the contention window until a maximum or minimum size is reached. For example, the base station may continue expanding the number of time resources until a maximum contention window size (e.g., cwMax) is reached. Additionally or alternatively, the base station may continue reducing the number of frequency resources until a minimum contention window size is reached. In some cases, an additional request message associated with the no-energy-detection protocol reattempt may be transmitted after the second contention window expires, where the additional request message indicates a set of time-frequency resources for the data transmission with fewer frequency resources than the indicated time-frequency resources for the data transmission in the initial request message.

If the base station initiates the data transmission, the UE may transmit one or more acknowledgement messages or a block-acknowledgement message to the base station in response to the initiated data transmission. The base station may receive the acknowledgement message(s) and determine whether the acknowledgement message(s) are satisfactory or not. If the acknowledgement message(s) are determined to be satisfactory, the base station may start a subsequent no-energy-detection protocol with the initial contention window size (e.g., restart the no-energy-detection protocol using a contention window with the initial size configuration). In some cases, the base station may determine whether the acknowledgement message(s) are satisfactory based on if a certain number of error-detecting code blocks have passed within a timeframe. For example, a satisfactory set of acknowledgement messages or a satisfactory block-acknowledgment message may be defined as greater than or equal to 20% of cyclic redundancy check (CRC)-passed code blocks within one transmission opportunity (TxOP). Alternatively, if the acknowledgement messages or block-acknowledgement message are determined to be not satisfactory, the base station may adjust the size of the contention window as described above and reattempt the no-energy-detection protocol by transmitting a request message on the adjusted contention window.

Aspects of the disclosure are initially described in the context of a wireless communications system. Further examples of a process flow, an additional wireless communications system, and contention window adjustments are then provided to illustrate aspects of the disclosure. Aspects of the disclosure are further illustrated by and described with reference to apparatus diagrams, system diagrams, and flowcharts that relate to a channel availability protocol in a shared spectrum.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 are supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a carrier aggregation (CA) configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115).

In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a CRC), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or discrete Fourier transform-spread-OFDM (DFT-S-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). Examples of shared spectrum include, but are not limited to, licensed radio frequency spectrum, unlicensed radio frequency spectrum, or a combination of licensed and unlicensed radio frequency spectrum. An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

As described above, wireless communications system 100 may utilize a shared (e.g., unlicensed) spectrum for communications between a UE 115 and a base station 105. The shared spectrum may include a licensed radio frequency (RF) spectrum, an unlicensed RF spectrum, or a combination of the licensed and unlicensed RF spectrum. As such, the UE 115 and the base station 105 may employ an LBT protocol to determine the availability of a channel (e.g., in the unlicensed RF spectrum) before starting communications. In order to determine the availability of the channel, the LBT protocol may be based on an energy-detection, where the UE 115 and the base station 105 determine whether a transmission is present on a channel based on sensing an amount of energy on the channel.

Additionally or alternatively, the LBT protocol may include a hand-shaking reservation (e.g., RTS/CTS), where a first message requesting communications (e.g., RTS) is transmitted and a second message indicating the channel is clear to communicate (e.g., CTS) on is transmitted back. The hand-shaking reservation-based LBT protocol may further include the UE 115 monitoring a broadcast reservation signal to determine the availability of a channel. However, the energy-detection and hand-shaking reservation techniques may be expensive to implement (e.g., require more components, higher signaling overhead, consume more power, etc.).

Wireless communications system 100 may utilize efficient techniques to enable a no-energy-detection protocol for determining an availability of a channel. A base station 105 (e.g., a transmitter) may maintain a first contention window with an initial size (e.g., cwMin). After waiting for the first contention window to expire, the base station 105 may transmit a request message (e.g., REQ message) to a UE 115 (e.g., a receiver) to initiate a data transmission and wait for the UE 115 to transmit a response message (e.g., RES message). In some cases, the request message may include an indication of time-frequency resources that may be utilized for the data transmission. Before transmitting the response message, the UE 115 may measure a decoding SINR (e.g., a signal quality metric) on the request message and determine if the decoding SINR measured on the request message is above a threshold associated with the request message (e.g., REQ-threshold).

If the decoding SINR measured on the request message is above the threshold associated with the request message, the UE 115 may transmit the response message to the base station. After receiving the response message, the base station 105 may then measure a decoding SINR on the response message and determine if the decoding SINR measured on the response message is above a threshold associated with the response message (e.g., RES-threshold). If the decoding SINR measured on the response message is above the threshold associated with the response message, the base station 105 may initiate the data transmission with the UE 115.

Alternatively, if the decoding SINR measured on the response message is below the threshold associated with the response message or no response message is received (e.g., the base station 105 waits for and does not receive the response message after a time indicated in the request message), the base station 105 may establish a second contention window and reattempt the no-energy-detection protocol with the UE 115 after the second contention window expires. In some cases, the second contention window may include more time resources than the first contention window, a subset of the frequency resources from the first contention window, or a combination thereof. Additionally or alternatively, a second request message transmitted after the second contention window expires may include an indication of time-frequency resources that may be utilized for the data transmission with fewer frequency resources than the indication of time-frequency resources for the data transmission included with the initial request message. Each time the decoding SINR on the response message does not exceed the threshold associated with the response message or the response message is not received, the base station 105 may establish a subsequent adjusted contention window and reattempt the no-energy-detection protocol with the UE 115 after the subsequent adjusted contention window expires. The base station 105 may continue adjusting the size of the contention window until a maximum or minimum size is reached.

If the base station 105 initiates the data transmission, the UE 115 may transmit one or more acknowledgement messages to the base station 105 in response to the initiated data transmission. The base station 105 may receive the acknowledgement messages and determine whether the acknowledgement messages are satisfactory or not. In some cases, the base station 105 may determine if the acknowledgement messages are satisfactory if a certain number of error-detecting code blocks have passed within a timeframe. If the acknowledgement messages are determined to be satisfactory, the base station 105 may start a second no-energy-detection protocol using the initial contention window size (e.g., restart the no-energy-detection protocol for a subsequent data transmission). Alternatively, if the acknowledgement messages are determined to be not satisfactory, the base station 105 may adjust the size of the contention window as described above and reattempt the no-energy-detection protocol after the adjusted contention window expires.

Figure 2:
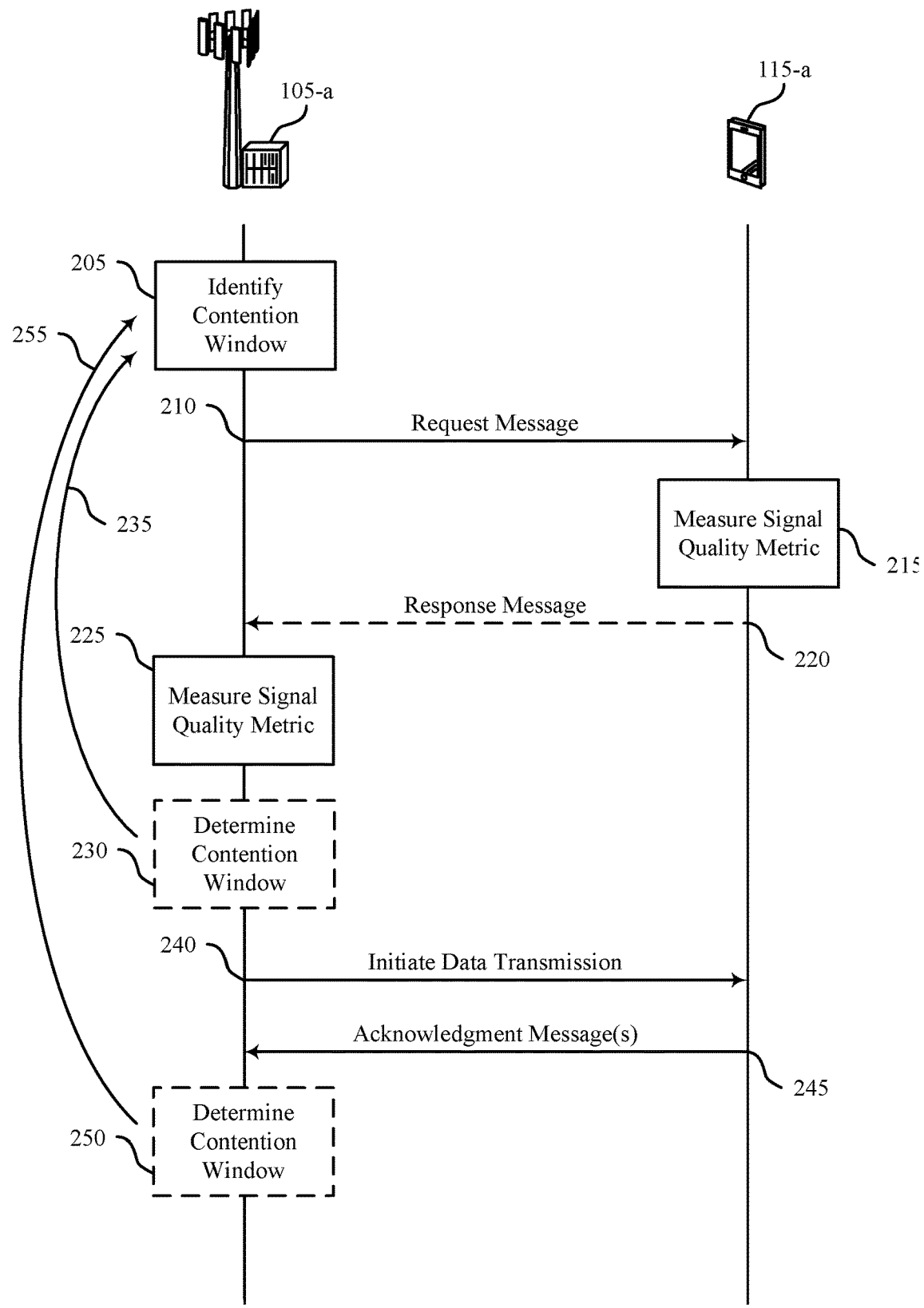
FIG. 2 illustrates an example of a process flow that supports a channel availability protocol in a shared spectrum in accordance with aspects of the present disclosure.

FIG. 2 illustrates an example of a process flow 200 that supports a channel availability protocol in a shared spectrum in accordance with various aspects of the present disclosure. In some examples, process flow 200 may implement aspects of wireless communications system 100. Process flow 200 may include a base station 105-a and a UE 115-a, which may be examples of corresponding devices as described with reference to FIG. 1. Base station 105-a may attempt a no-energy-detection protocol to determine the availability of a channel for communications with UE 115-a in a shared frequency spectrum band. The shared frequency spectrum band may include a licensed RF spectrum, an unlicensed RF spectrum, or a combination of the licensed and unlicensed RF spectrum.

In the following description of the process flow 200, the operations between the UE 115-a and base station 105-a may be performed in different orders or at different times. Certain operations may also be left out of the process flow 200, or other operations may be added to the process flow 200. It is to be understood that while a base station 105 and a UE 115 are shown performing a number of the operations of process flow 200, any transmitting or receiving device may perform the operations shown.

At 205, base station 105-a (e.g., a transmitter) may identify a contention window including a first set of time-frequency resources. In some cases, the first set of time-frequency resources may include two (2) OFDM symbols or two (2) contention slots, where each contention slot lasts a certain duration (e.g., nine (9) microseconds). Additionally, the first set of time-frequency resources may constitute an initial contention window size (e.g., cwMin).

At 210, base station 105-a may transmit a request message to request initiation of a data transmission to UE 115-a after the contention window expires. In some cases, the request message may include a specified time for UE 115-a to transmit a response message to the request message. Additionally, the request message may include an identification of UE 115-a. As such, the request message may last one length of a TTI (e.g., one (1) OFDM symbol) since a minimal amount of data is included (e.g., the request message is "thin"). Base station 105-a may transmit the request message over a physical downlink control channel (PDCCH). Additionally, the request message may include an indication of time-frequency resources for the data transmission. In some cases, the indication of time-frequency resources may be included as a pay-load in the request message. Alternatively, the indication of time-frequency resources may be identified by the occupied frequency resources of a physical signal associated with the request message. Additionally or alternatively, the indication of time-frequency resources may be identified by the spatial domain of the request message.

At 215, UE 115-a may measure a signal quality metric associated with the received request message at 210. In some cases, the signal quality metric associated with the received message may include an SNR or an SINR associated with the received message. Additionally, the signal quality metric associated with the request message may be independent of an energy detection. In some protocols, a UE 115 may measure the energy from all nodes (e.g., nearby receivers and transmitters) to see whether the channel or medium is clear for communications. However, for the no-energy-detection protocol described herein, UE 115-a may measure the signal quality metric associated with the request message from base station 105-a and may not measure frequency energies associated with nearby UEs 115 or base stations 105.

At 220, based on the signal quality metric measurement exceeding a request threshold associated with the request message, UE 115-a may transmit a response message to base station 105-a. In some cases, UE 115-a may receive the request threshold as part of the request message received at 210. Alternatively, UE 115-a may receive the request threshold in an RRC broadcast message from base station 105-a prior to the no-energy-detection protocol. In some cases, UE 115-a may transmit the response message as part of a sounding reference signal (SRS) transmission. Similar to the request message, the response message may last one length of a TTI (e.g., one (1) OFDM symbol) for including a minimal amount of data (e.g., the response message is "thin").

At 225, base station 105-a may measure a signal quality metric associated with the received response message at 220 from UE 115-a. Similar to the signal quality metric associated with the request message, the signal quality metric associated with the received response message may include an SNR or an SINR associated with the received message. Additionally, base station 105-a may measure the signal quality metric associated with the received response message independently of an energy detection associated with the receiver (e.g., no-energy-detection protocol). In some cases, base station 105-a may determine whether the signal quality metric associated with the received response message exceeds a response threshold. The response threshold may be embedded in the request message or defined previously based on a rank or table of thresholds. In some cases, the request threshold may be greater than the response threshold depending on the direction of transmission (e.g., downlink).

At 230, base station 105-a may determine a second contention window including a second set of time-frequency resources different from the first set of time-frequency resources based on measuring the signal quality metric. For example, base station 105-a may determine that the signal quality metric measurement associated with the response message does not exceed the response threshold or that response message was not received and may determine the second contention window based on that determination. In some cases, base station 105-a may determine that the response message was not received based on waiting for the response message for a time that includes at least the time specified in the request message for UE 115-a to transmit the response message. For the second contention window, the second set of time-frequency resources may include a second number of time resources, the second number of time resources being greater than a first number of time resources in the first set of time-frequency resources for the initial contention window (e.g., double the number of time resources in the initial contention window). Additionally or alternatively, the second set of time-frequency resources may include a second number of frequency resources, the second number of frequency resources being less than a first number of frequency resources in the first set of time-frequency resources for the initial contention window (e.g., a subset of the frequency resources in the initial contention window).

At 235, base station 105-a may reattempt the no-energy-detection protocol after determining the second contention window at 230. Accordingly, base station 105-a may transmit a second request message to UE 115-a after the second contention window expires, receive a second response message from UE 115-a based on a second time indicated in the second request message, and measure a second signal quality metric associated with the second response message, the measuring being independent of an energy detection.

In some cases, base station 105-a may reattempt the no-energy-detection protocol each time the signal quality metric measurement associated with the response message does not exceed the response threshold or the response message is not received, and the base station may determine an additional contention window each time up to a maximum or minimum value. For example, base station 105-a may determine that the second set of time-frequency resources has not reached a maximum contention window time value (e.g., cwMax). In some cases, the maximum contention window time value may be greater than or equal to twice the length of a TTI (e.g., a TxOP). Accordingly, base station 105-a may determine a third contention window that includes a third set of time-frequency resources with a third number of time resources that is greater than the second number of time resources of the second set of time-frequency resources.

Additionally or alternatively, base station 105-a may determine that the second set of time-frequency resources has not reached a minimum contention window frequency value. Accordingly, base station 105-a may determine a third contention window that includes a third set of time-frequency resources with a third number of frequency resources less than the second number of frequency resources of the second set of time-frequency resources. Base station 105-a may then reattempt the no-energy-detection protocol after the third contention window expires and so on until the maximum contention window time value or the minimum contention window frequency value is reached.

In some cases, base station 105-a may indicate a second set of time-frequency resources that may be utilized for the data transmission in the second request message, where the second set of time-frequency resources include an indication of fewer frequency resources than the indication of time-frequency resources for the data transmission included with the first request message.

At 240, base station 105-a may initiate the data transmission with UE 115-a in the shared frequency spectrum band based on whether the signal quality metric measurement associated with the received response message exceeds the response threshold.

At 245, UE 115-a may transmit one or more acknowledgement messages to base station 105-a based on receiving the data transmission within a TTI (e.g., a TxOP). In some cases, the one or more acknowledgement messages may include a block-acknowledgement message. Base station 105-a may determine if the one or more acknowledgement messages are satisfactory. In some cases, the satisfactory one or more acknowledgement messages may include an indication that an amount of code blocks for the initiated data transmission have been correctly checked within the transmission time interval. For example, the satisfactory one or more acknowledgement messages may be defined as greater than or equal to 20% of CRC-passed code blocks within one TxOP.

At 250, base station 105-a may determine a second contention window based on whether the one or more acknowledgement messages are satisfactory. For example, if the one or more acknowledgement messages are satisfactory, base station 105-a may transmit an additional request to UE 115-a (e.g., starting a second no-energy-detection protocol) using the second set of time-frequency resources, where a size of the second contention window is the same as the size of the initial contention window identified at 205. Additionally, in some cases, base station 105-a may have set the initial contention window to the first set of time-frequency resources based on receiving satisfactory one or more acknowledgement messages from a previous no-energy-detection protocol. Alternatively, if the one or more acknowledgement messages are determined to be not satisfactory, base station 105-a may determine a second contention window with a different size as described above.

At 255, base station 105-a may reattempt the no-energy-detection protocol with the determined contention window based on whether the received one or more acknowledgement messages are satisfactory or not. If the one or more acknowledgement messages are determined to be satisfactory, base station 105-a may start a second no-energy detection protocol with a contention window that includes the initial contention window size. Alternatively, if the one or more acknowledgement messages are not determined to be satisfactory, base station 105-a may reattempt the no-energy-detection protocol with the second contention window that has a different size. The reattempts may continue until the maximum contention window time value or the minimum contention window frequency value is reached as described above.

In some cases, instead of reattempting the no-energy-detection protocol using an extended contention window or a portion of the contention window with UE 115-a, base station 105-a may attempt the no-energy-detection protocol with a different UE 115. Additionally or alternatively, base station 105-a may attempt the no-energy-detection protocol on a different antenna pattern (e.g., different directional antennas using mmW communications) with UE 115-a before reattempting with an extended contention window (e.g., in the time-domain) or portions of the contention window (e.g., in the frequency-domain). In some cases, base station 105-a may identify an additional contention window when attempting the no-energy-detection protocol with a separate UE 115 or on a different antenna pattern with UE 115-a as noted above. Alternatively, base station 105-a may attempt the separate no-energy-detection protocols without defining an additional contention window.

Figure 3:
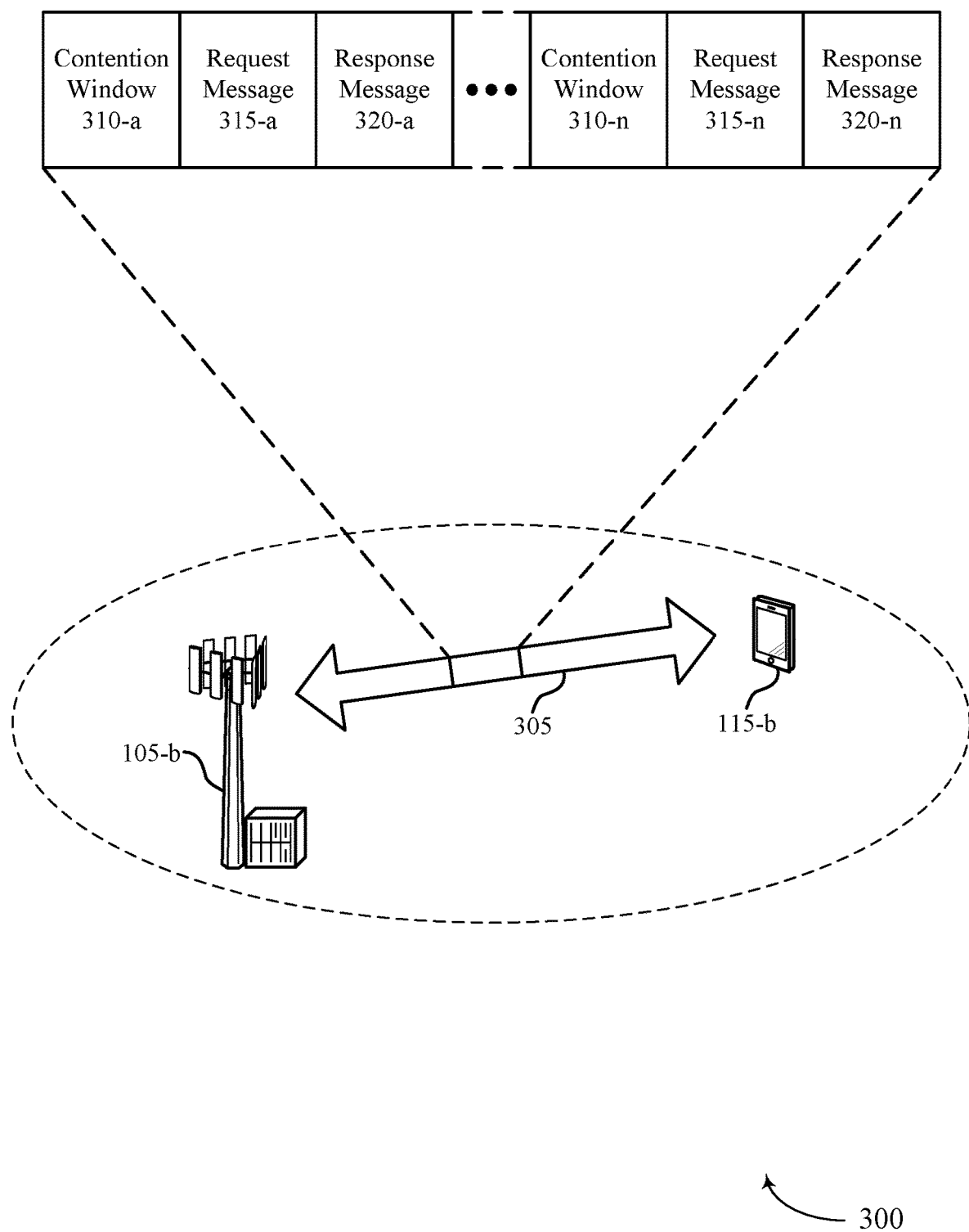
FIG. 3 illustrates an example of a wireless communications system that supports a channel availability protocol in a shared spectrum in accordance with aspects of the present disclosure.

FIG. 3 illustrates an example of a wireless communications system 300 that supports a channel availability protocol in a shared spectrum in accordance with various aspects of the present disclosure. In some examples, wireless communications system 300 may implement aspects of wireless communications system 100. Wireless communications system 300 may include a base station 105-b and UE 115-b, which may be examples of corresponding devices as described with reference to FIGS. 1 and 2. In some cases, base station 105-*b* and UE 115-*b* may attempt a no-energy-detection protocol to determine if a channel is available for initiating a data transmission on carrier 305. The no-energy-detection protocol may include a similar procedure as process flow 200 described above with reference to FIG. 2.

Base station 105-*b* may identify a first contention window 310-*a*. After contention window 310-*a* expires, base station 105-*b* may transmit a first request message 315-*a* to UE 115-*b* to initiate a data transmission on a shared spectrum band of carrier 305. UE 115-*b* may receive first request message 315-*a* and measure a signal quality metric (e.g., an SNR or SINR, such as a decoding SNR) on first request message 315-*a*. In some cases, first request message 315-*a* may include an indication of a first set of time-frequency resources that may be utilized for the data transmission. If the measured signal quality metric for first request message 315-*a* is above a request threshold, UE 115-*b* may transmit a first response message 320-*a* to base station 105-*b*. Base station 105-*b* may then measure a signal quality metric on first response message 320-*a*. If the measured signal quality for first response message 320-*a* is above a response threshold, base station 105-*b* may initiate the data transmission.

Alternatively, if the measured signal quality for first response message 320-*a* is below the response threshold or first response message 320-*a* is not received, base station 105-*b* may determine a second contention window 310. Base station 105-*b* may determine that first response message 320-*a* is not received based on waiting an amount of time included in request message 315-*a* (e.g., until an indicated time in request message 315-*a*). As described above, the second contention window 310 may include an expanded contention window (e.g., more time resources than first contention window 310-*a*) or a portion of contention window 310-*a* (e.g., fewer frequency resources). Base station 105-*b* may configure additional contention windows up to contention window 310-*n* for each time a measured signal quality for a response message 320 is below the response threshold or a response message 320 is not received. In some cases, contention window 310-*n* may include a maximum contention window time value or a minimum contention window frequency value. After contention window 310-*n* expires, base station 105-*b* may transmit a request message 315-*n*, and UE 115-*b* may consequently transmit a response message 320-*n*. In some cases, request message 315-*n* may include an indication of an additional set of time-frequency resources that may be utilized for the data transmission, where the additional set of time-frequency resources may indicate fewer frequency resources for the data transmission than the first set of time-frequency resources in request message 315-*a*.

Additionally or alternatively, contention window 310-*n* may indicate the last contention window 310 utilized before a successful no-energy-detection protocol has occurred. As such, base station 105-*b* may restart the no-energy-detection protocol with first contention window 310-*a*.

Figure 4A:
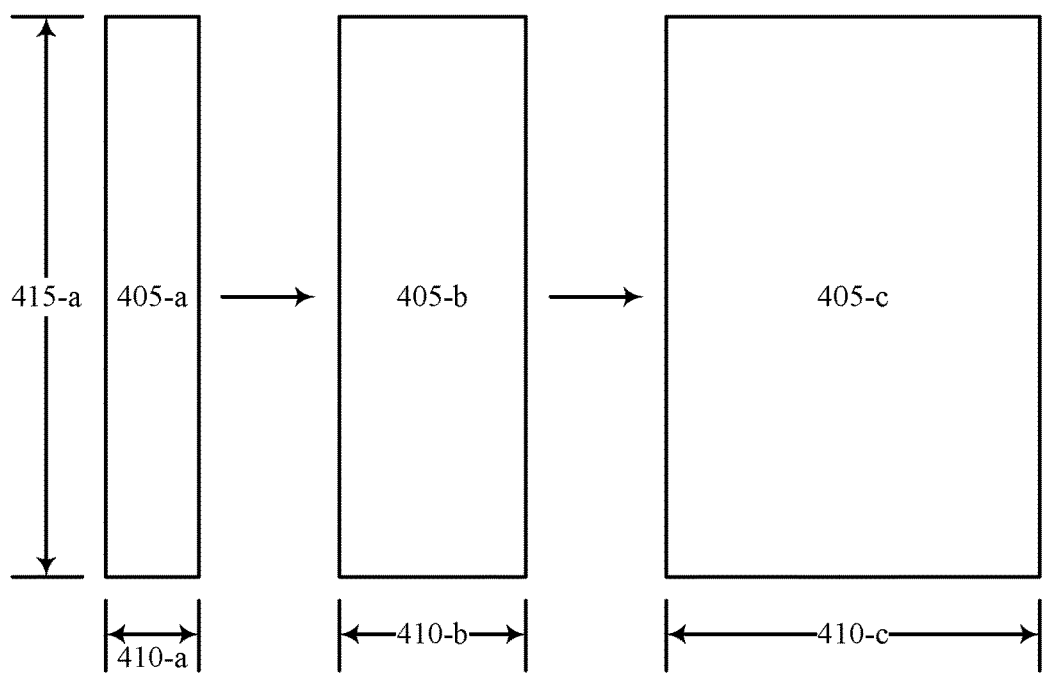
FIGS. 4A and 4B illustrate examples of contention window adjustments that support a channel availability protocol in a shared spectrum in accordance with aspects of the present disclosure.

FIG. 4A illustrates an example of a contention window adjustment 400 that supports a channel availability protocol in a shared spectrum in accordance with various aspects of the present disclosure. In some examples, contention window adjustment 400 may implement aspects of wireless communications system 100 and 300. Contention window adjustment 400 may be included as part of a no-energy-detection protocol as described in process flow 200 with respect to FIG. 2. For example, if a base station 105 reattempts the no-energy-detection protocol with a different sized contention window, the base station 105 may employ a similar procedure as shown in contention window adjustment 400 to determine a new contention window size.

The base station 105 may identify a first contention window 405-*a* that includes a first time duration 410-*a* and a set of frequency resources 415-*a*. As described above, if a measured signal quality metric for a response message is below a threshold, the response message is not received, or one or more acknowledgement messages are determined to be not satisfactory, the base station 105 may determine a second contention window 405-*b*. Second contention window 405-*b* may include a second time duration 410-*b* and the set of frequency resources 415-*a*. In some cases, second time duration 410-*b* may be greater than first time duration 410-*a*, while the set of frequency resources 415-*a* may be the same for first contention window 405-*a* and second contention window 405-*b*. For example, second time duration 410-*b* may be double the length of first time duration 410-*a* (e.g., includes twice as many time resources). The base station 105 may reattempt the no-energy-detection protocol after second contention window 405-*b* expires.

Similar to before, the measured signal quality metric for the response message may be below a threshold, the response message may not be received, or one or more acknowledgement messages may be determined to be not satisfactory, and the base station 105 may determine a third contention window 405-*c*. Third contention window 405-*c* may include a third time duration 410-*b* and the set of frequency resources 415-*a*. In some cases, third time duration 410-*c* may be greater than second time duration 410-*b* and first time duration 410-*a*, while the set of frequency resources 415-*a* may be the same for each contention window 405. For example, third time duration 410-*c* may be double the length of second time duration 410-*b* (e.g., includes twice as many time resources). The base station 105 may reattempt the no-energy-detection protocol after third contention window 405-*b* expires.

The base station 105 may determine an additional contention window 405 each time a measured signal quality metric for a response message is below a threshold, the response message is not received, or one or more acknowledgement messages are determined to be not satisfactory, up to a maximum time duration 410 (e.g., cwMax). Additionally or alternatively, when the measured signal quality metric for the response message exceeds the threshold or the one or more acknowledgement messages are determined to be satisfactory, the base station 105 may reset the contention window to the size of contention window 405-*a* for further no-energy-detection protocols.

Figure 4B:
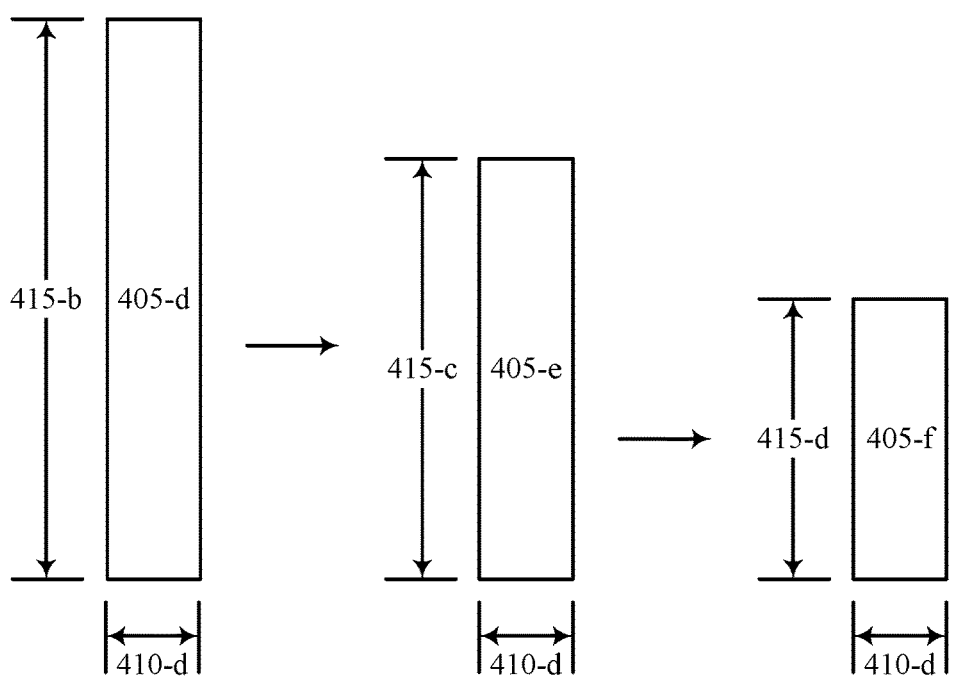

FIG. 4B illustrates an example of a contention window adjustment 401 that supports a channel availability protocol in a shared spectrum in accordance with various aspects of the present disclosure. In some examples, contention window adjustment 401 may implement aspects of wireless communications system 100 and 300. Contention window adjustment 401 may be included as part of a no-energy-detection protocol as described in process flow 200 with respect to FIG. 2. For example, if a base station 105 reattempts the no-energy-detection protocol with a different sized contention window, the base station 105 may employ a similar procedure as shown in contention window adjustment 401 to determine a new contention window size.

The base station 105 may identify a first contention window 405-*d* that includes a time duration 410-*d* and a first set of frequency resources 415-*b*. As described above, if a measured signal quality metric for a response message is below a threshold, the response message is not received, or one or more acknowledgement messages are determined to be not satisfactory, the base station 105 may determine a second contention window 405-*e*. Second contention window 405-*e* may include the time duration 410-*d* and a second set of frequency resources 415-*c*. In some cases, the second set of frequency resources 415-*c* may be less than the first set of frequency resources 415-*b*, while the time duration 410-*d* may be the same for first contention window 405-*d* and second contention window 405-*e*. For example, the second set of frequency resources 415-*c* may be a subset of the first set of frequency resources 415-*b*. The base station 105 may reattempt the no-energy-detection protocol after second contention window 405-*e* expires.

Similar to before, the measured signal quality metric for the response message may be below a threshold, the response message may not be received, or one or more acknowledgement messages may be determined to be not satisfactory, and the base station 105 may determine a third contention window 405-*f*. Third contention window 405-*f* may include the time duration 410-*d* and a third set of frequency resources 415-*d*. In some cases, the third set of frequency resources 415-*d* may be less than the second set of frequency resources 415-*c* and first set of frequency resources 415-*b*, while the time duration 410-*d* may be the same for each contention window 405. For example, the third set of frequency resources 415-*d* may be a subset of the second set of frequency resources 415-*c*. The base station 105 may reattempt the no-energy-detection protocol after third contention window 405-*f* expires.

The base station 105 may determine an additional contention window 405 each time a measured signal quality metric for a response message is below a threshold, the response message is not received, or one or more acknowledgement messages are determined to be not satisfactory down to a minimum set of frequency resources 415. Additionally or alternatively, when the measured signal quality metric for the response message exceeds the threshold or the one or more acknowledgement messages are determined to be satisfactory, the base station 105 may reset the contention window to the size of contention window 405-*d* for further no-energy-detection protocols.

Additionally or alternatively, the iterative process of decreasing the amount of frequency resources may be extended to an indicated amount of time-frequency resources to be utilized for the data transmission. The base station 105 may indicate a first set of time-frequency resources including a first set of frequency resources 415-*b* in a first request message to a UE 115. If the measured signal quality metric for the response message is below a threshold, the response message is not received, or one or more acknowledgement messages are determined to be not satisfactory, the base station 105 may indicate a second set of time-frequency resources including a second set of frequency resources 415-*c* for the data transmission in a second request message to the UE 115, where the second set of frequency resources 415-*c* is less than the first set of frequency resources 415-*b*. The base station 105 may indicate fewer frequency resources in each subsequent request message for the data transmission after a no-energy-detection protocol attempt until a minimum amount of frequency resources is reached.

Figure 5:
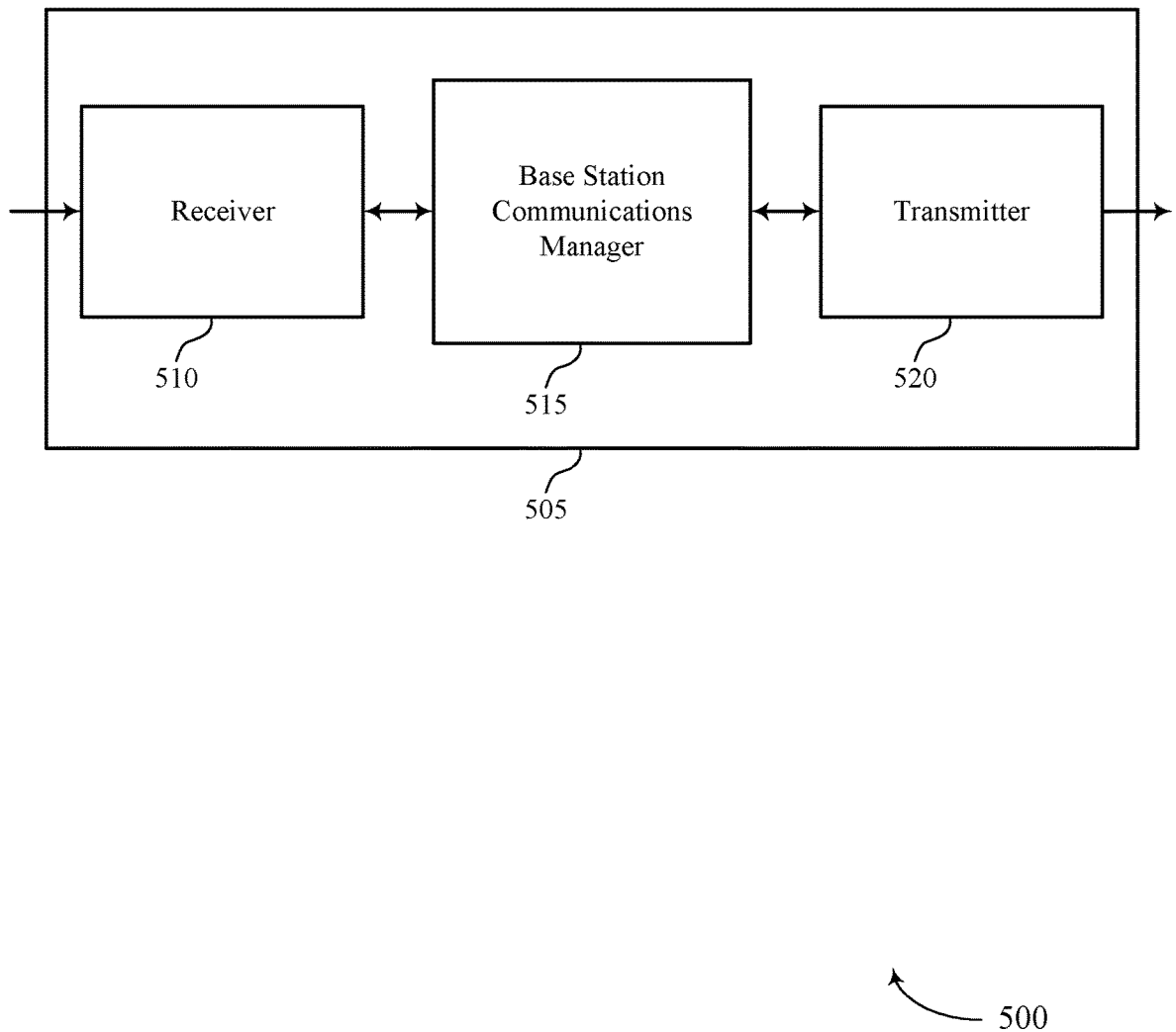
FIGS. 5 through 7 show block diagrams of a device that supports a channel availability protocol in a shared spectrum in accordance with aspects of the present disclosure.

FIG. 5 shows a block diagram 500 of a wireless device 505 that supports a channel availability protocol in a shared spectrum in accordance with aspects of the present disclosure. Wireless device 505 may be an example of aspects of a base station 105 as described herein. In some cases, wireless device 505 may be an example of aspects of a transmitter as described herein. Wireless device 505 may include receiver 510, base station communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, information related to channel availability protocol in a shared spectrum, etc.). Information may be passed on to other components of the device. The receiver 510 may be an example of aspects of the transceiver 835 described with reference to FIG. 8. The receiver 510 may utilize a single antenna or a set of antennas.

Base station communications manager 515 may be an example of aspects of the base station communications manager 815 described with reference to FIG. 8.

Base station communications manager 515 and/or at least some of its various sub-components may be implemented in hardware, software executed by a processor, firmware, or any combination thereof. If implemented in software executed by a processor, the functions of the base station communications manager 515 and/or at least some of its various sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The base station communications manager 515 and/or at least some of its various sub-components may be physically located at various positions, including being distributed such that portions of functions are implemented at different physical locations by one or more physical devices. In some examples, base station communications manager 515 and/or at least some of its various sub-components may be a separate and distinct component in accordance with various aspects of the present disclosure. In other examples, base station communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 515 may identify a contention window including a first set of time-frequency resources. In some cases, base station communications manager 515 may transmit, to a receiver after the contention window expires, a request message to request initiation of a data transmission. Base station communications manager 515 may then receive a message from the receiver in response to the request message. Additionally, base station communications manager 515 may measure a signal quality metric associated with the received message. Subsequently, base station communications manager 515 may initiate the data transmission in a shared frequency spectrum band based on whether the signal quality metric measurement associated with the received message exceeds a response threshold.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
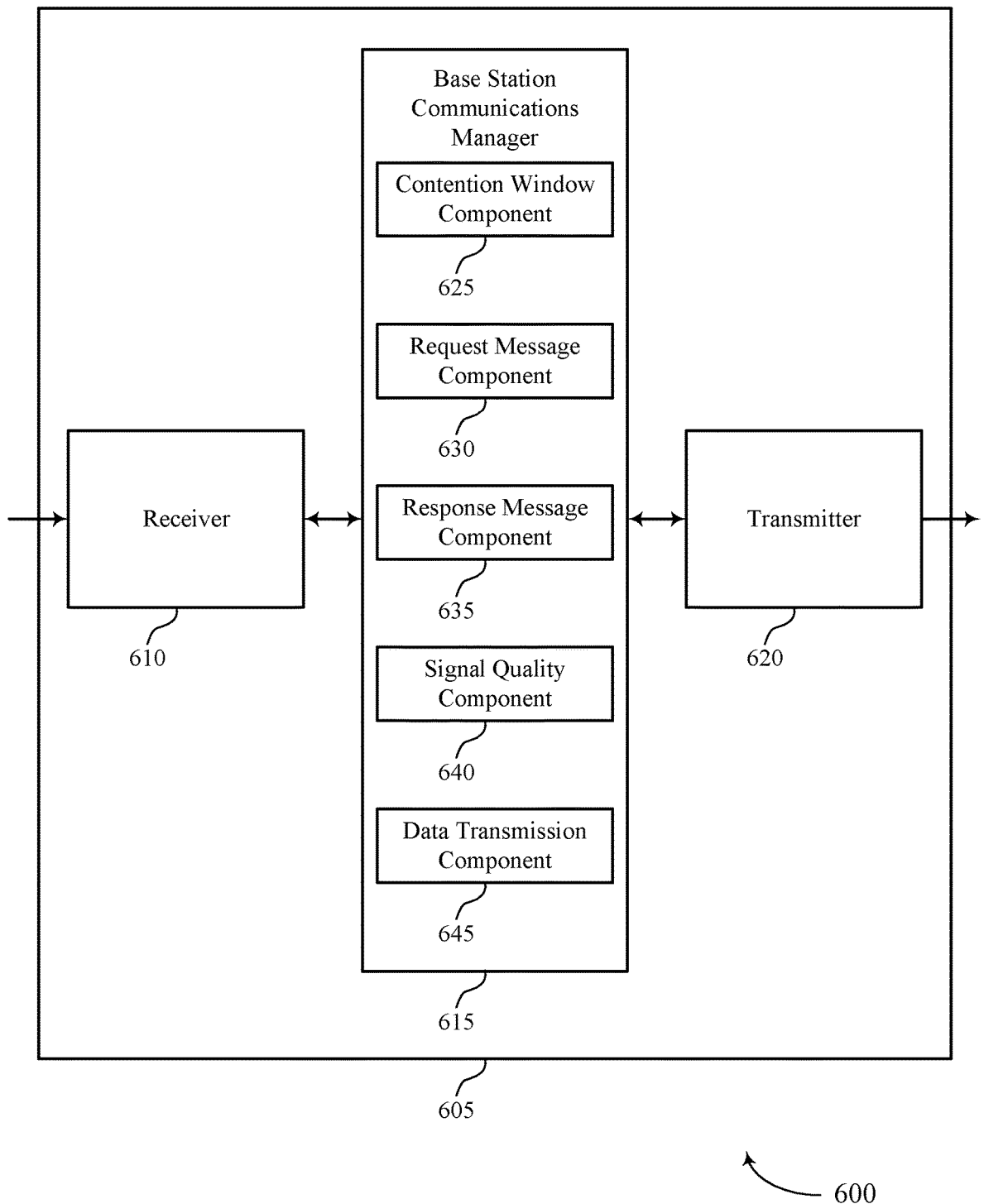

FIG. 6 shows a block diagram 600 of a wireless device 605 that supports a channel availability protocol in a shared spectrum in accordance with aspects of the present disclosure. Wireless device 605 may be an example of aspects of a wireless device 505, a base station 105, or a transmitter as described with reference to FIG. 5. Wireless device 605 may include receiver 610, base station communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, information related to channel availability protocol in a shared spectrum, etc.). Information may be passed on to other components of the device. The receiver 610 may be an example of aspects of the transceiver 835 described with reference to FIG. 8. The receiver 610 may utilize a single antenna or a set of antennas.

Base station communications manager 615 may be an example of aspects of the base station communications manager 815 described with reference to FIG. 8.

Base station communications manager 615 may also include contention window component 625, request message component 630, response message component 635, signal quality component 640, and data transmission component 645.

Contention window component 625 may identify a contention window including a first set of time-frequency resources and set the contention window to the first set of time-frequency resources based on receiving satisfactory one or more acknowledgement messages from the receiver within a transmission time interval, the satisfactory one or more acknowledgement messages including an indication that an amount of code blocks for the initiated data transmission have been correctly checked within the transmission time interval.

Request message component 630 may transmit, to a receiver after the contention window expires, a request message to request initiation of a data transmission, transmit an additional request to the receiver using the second set of time-frequency resources based on determining that the satisfactory one or more acknowledgment messages have been received, and transmit the request message to a second receiver different from the receiver after transmitting the request message to the receiver. In some cases, the request message includes an indication of the response threshold. In some cases, the request message includes an identification of the receiver. In some cases, the request message includes one length of a transmission time interval. In some cases, the request message is transmitted on a physical downlink control channel. In some cases, the request message includes an indication of time-frequency resources for the data transmission.

Response message component 635 may receive a message from the receiver in response to the request message. In some cases, the message from the receiver is based on a measurement of a signal quality metric associated with the request message. In some cases, receiving the message from the receiver in response to the request message may include waiting for the message from the receiver at a time indicated in the requested message.

Signal quality component 640 may measure a signal quality metric associated with the received message. In some cases, signal quality component 640 may then determine that the signal quality metric measurement does not exceed the response threshold or that the transmitter failed to receive the message, where determining the second contention window is based on determining that the signal quality metric measurement does not exceed the response threshold or that the transmitter failed to receive the message from the receiver based on a time indicated in the request message. Accordingly, signal quality component 640 may measure the signal quality metric associated with the received message independent of an energy detection associated with the receiver. In some cases, the signal quality metric associated with the received message includes an SNR or an SINR associated with the received message.

Data transmission component 645 may initiate the data transmission in a shared frequency spectrum band based on whether the signal quality metric measurement associated with the received message exceeds a response threshold.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
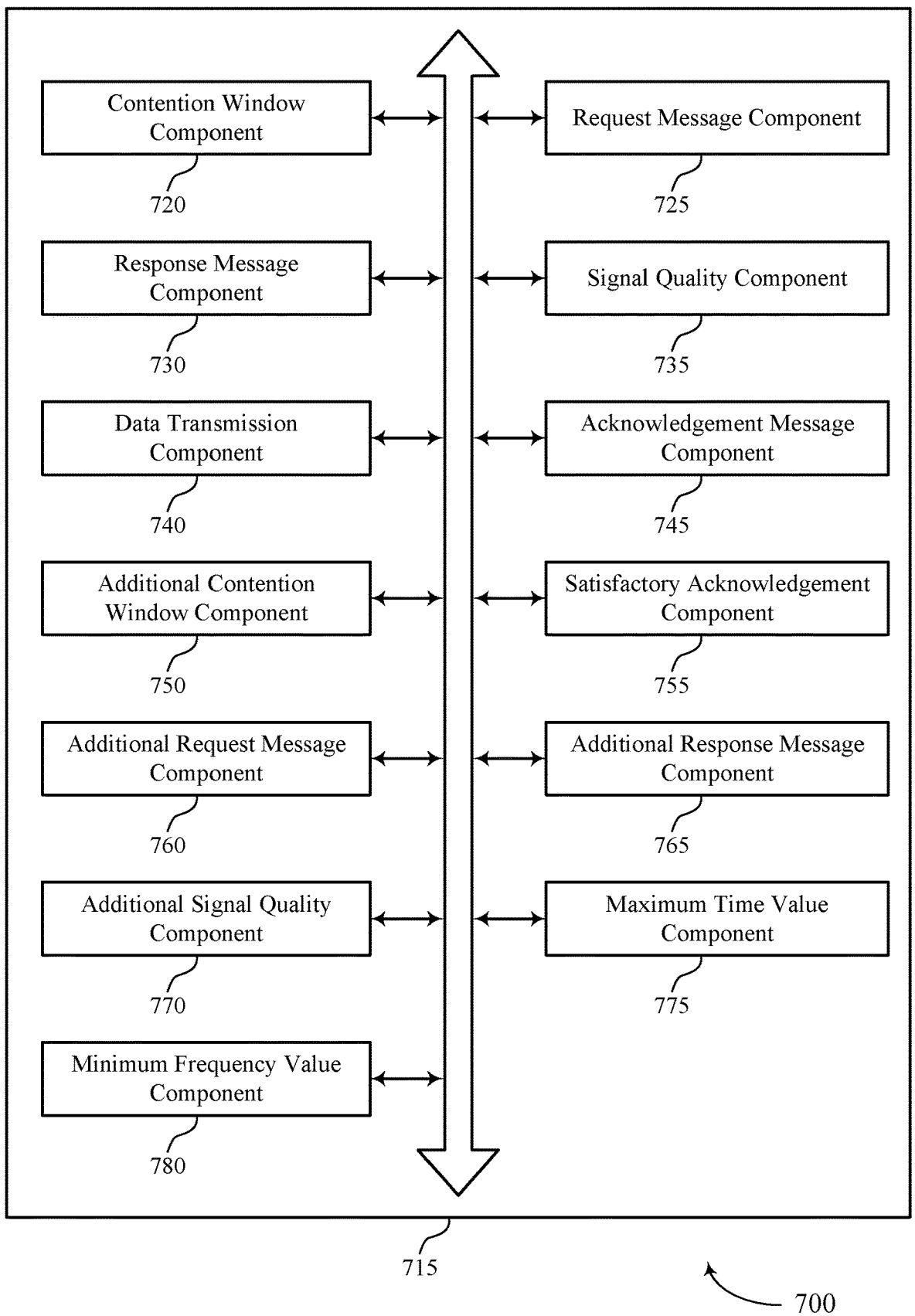

FIG. 7 shows a block diagram 700 of a base station communications manager 715 that supports a channel availability protocol in a shared spectrum in accordance with aspects of the present disclosure. The base station communications manager 715 may be an example of aspects of a base station communications manager 515, a base station communications manager 615, or a base station communications manager 815 described with reference to FIGS. 5, 6, and 8. The base station communications manager 715 may include contention window component 720, request message component 725, response message component 730, signal quality component 735, data transmission component 740, acknowledgement message component 745, additional contention window component 750, satisfactory acknowledgement component 755, additional request message component 760, additional response message component 765, additional signal quality component 770, maximum time value component 775, and minimum frequency value component 780. Each of these modules may communicate, directly or indirectly, with one another (e.g., via one or more buses).

Contention window component 720 may identify a contention window including a first set of time-frequency resources and set the contention window to the first set of time-frequency resources based on receiving satisfactory one or more acknowledgement messages from the receiver within a transmission time interval, the satisfactory one or more acknowledgement messages including an indication that an amount of code blocks for the initiated data transmission have been correctly checked within the transmission time interval.

Request message component 725 may transmit, to a receiver after the contention window expires, a request message to request initiation of a data transmission, transmit an additional request to the receiver using the second set of time-frequency resources based on determining that the satisfactory one or more acknowledgment messages have been received, and transmit the request message to a second receiver different from the receiver after transmitting the request message to the receiver. In some cases, the request message includes an indication of the response threshold. In some cases, the request message includes an identification of the receiver. In some cases, the request message includes one length of a transmission time interval. In some cases, the request message is transmitted on a physical downlink control channel. In some cases, the request message includes an indication of time-frequency resources for the data transmission.

Response message component 730 may receive a message from the receiver in response to the request message. In some cases, the message from the receiver is based on a measurement of a signal quality metric associated with the request message. In some cases, receiving the message from the receiver in response to the request message may include waiting for the message from the receiver at a time indicated in the requested message.

Signal quality component 735 may measure a signal quality metric associated with the received message. In some cases, signal quality component 735 may then determine that the signal quality metric measurement does not exceed the response threshold or that the transmitter failed to receive the message, where determining the second contention window is based on determining that the signal quality metric measurement does not exceed the response threshold or that the transmitter failed to receive the message from the receiver based on a time indicated in the request message. Accordingly, signal quality component 735 may measure the signal quality metric associated with the received message independent of an energy detection associated with the receiver. In some cases, the signal quality metric associated with the received message includes an SNR or an SINR associated with the received message.

Data transmission component 740 may initiate the data transmission in a shared frequency spectrum band based on whether the signal quality metric measurement associated with the received message exceeds a response threshold.

Acknowledgement message component 745 may receive one or more acknowledgment messages from the receiver within a TTI based on initiating the data transmission.

Additional contention window component 750 may determine, based on measuring the signal quality metric, a second contention window including a second set of time-frequency resources that are different from the first set of time-frequency resources. In some cases, a first size of the contention window and a second size of the second contention window are the same. Alternatively, the second set of time-frequency resources may include a second number of time resources, the second number of time resources being greater than a first number of time resources in the first set of time-frequency resources. In some cases, the second set of time-frequency resources may include a second number of frequency resources, the second number of frequency resources being less than a first number of frequency resources in the first set of time-frequency resources.

Additional contention window component 750 may also determine a third contention window including a third set of time-frequency resources with a third number of time resources that is greater than the second number of time resources of the second set of time-frequency resources based on determining that the second set of time-frequency resources has not reached the maximum contention window time value. Additionally or alternatively, additional contention window component 750 may determine the third contention window including a third set of time-frequency resources with a third number of frequency resources less than the second number of frequency resources of the second set of time-frequency resources based on determining that the second set of time-frequency resources has not reached the minimum contention window frequency value.

Satisfactory acknowledgement component 755 may determine that the one or more acknowledgement messages received from the receiver within a transmission time interval are satisfactory, the satisfactory one or more acknowledgement messages including an indication that an amount of code blocks for the initiated data transmission have been correctly checked within the transmission time interval. In some cases, determining the second contention window may be based on determining that the satisfactory one or more acknowledgement messages have been received. Additionally or alternatively, satisfactory acknowledgement component 755 may determine that the one or more acknowledgement messages received from the receiver within a TTI are not satisfactory, the not satisfactory one or more acknowledgement messages including an indication that an amount of code blocks for the initiated data transmission have not been correctly checked within the transmission time interval. In some cases, determining the second contention window may be based on determining that the not satisfactory one or more acknowledgment messages have been received from the receiver.

Additional request message component 760 may transmit a second request message to the receiver after the second contention window expires. In some cases, the second request message includes a second request initiation for the data transmission and an indication of frequency resources to be used for the data transmission, the frequency resources being fewer than an indication of frequency resources associated with the request message.

Additional response message component 765 may receive a second message from the receiver based on a second time indicated in the second request message.

Additional signal quality component 770 may measure a second signal quality metric associated with the second message, the measuring being independent of an energy detection, where initiating the data transmission is based on the second signal quality metric measurement exceeding the response threshold.

Maximum time value component 775 may determine that the second set of time-frequency resources has not reached a maximum contention window time value.

Minimum frequency value component 780 may determine that the second set of time-frequency resources has not reached a minimum contention window frequency value.

Figure 8:
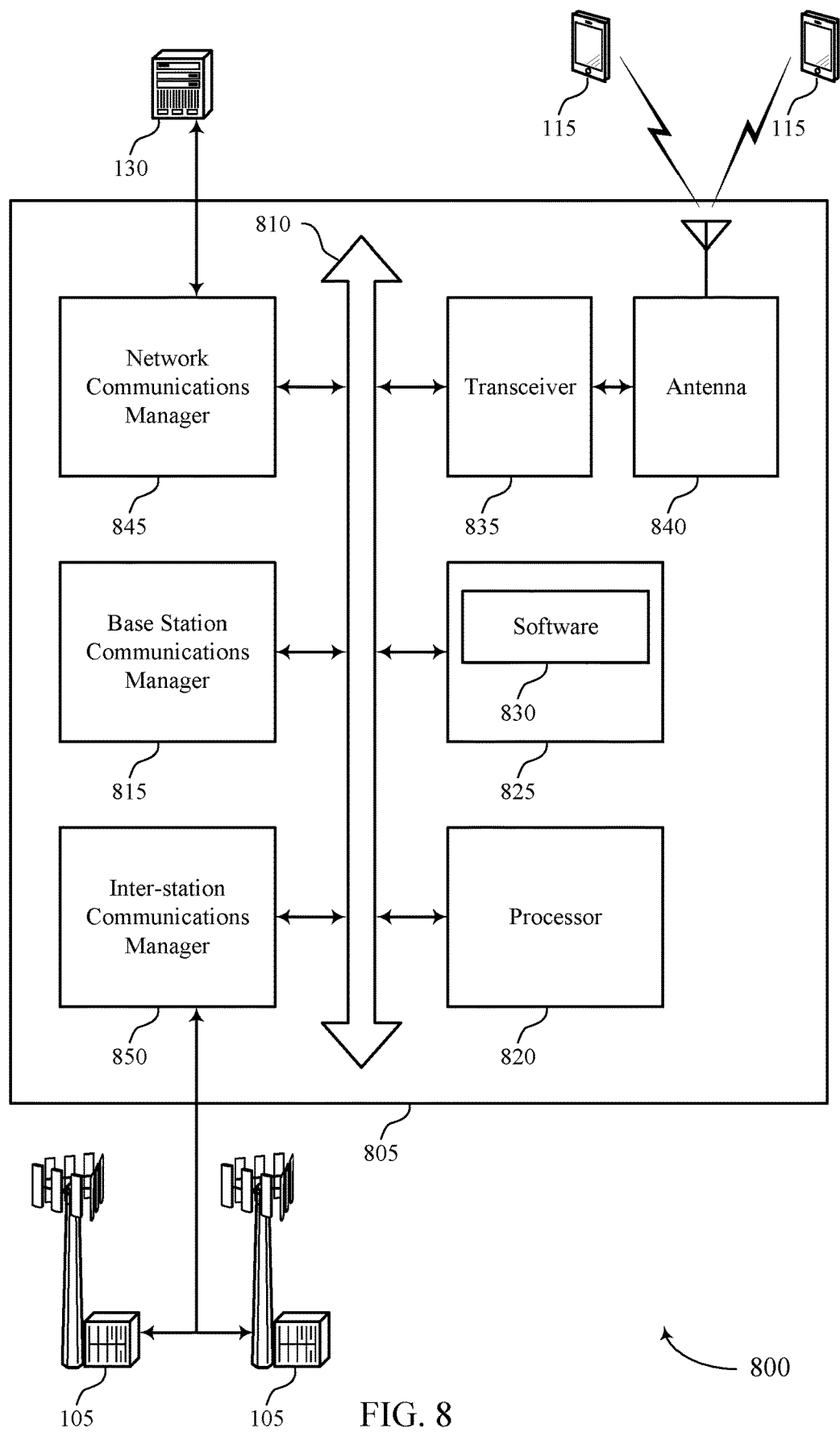
FIG. 8 illustrates a block diagram of a system including a base station that supports a channel availability protocol in a shared spectrum in accordance with aspects of the present disclosure.

FIG. 8 shows a diagram of a system 800 including a device 805 that supports a channel availability protocol in a shared spectrum in accordance with aspects of the present disclosure. Device 805 may be an example of or include the components of wireless device 505, wireless device 605, or a base station 105 as described above, e.g., with reference to FIGS. 5 and 6. Device 805 may include components for bi-directional voice and data communications including components for transmitting and receiving communications, including base station communications manager 815, processor 820, memory 825, software 830, transceiver 835, antenna 840, network communications manager 845, and inter-station communications manager 850. These components may be in electronic communication via one or more buses (e.g., bus 810). Device 805 may communicate wirelessly with one or more UEs 115.

Processor 820 may include an intelligent hardware device (e.g., a general-purpose processor, a DSP, a central processing unit (CPU), a microcontroller, an ASIC, an FPGA, a PLD, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting channel availability protocol in a shared spectrum).

Memory 825 may include random-access memory (RAM) and read-only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support channel availability protocol in a shared spectrum. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

Network communications manager 845 may manage communications with the core network (e.g., via one or more wired backhaul links). For example, the network communications manager 845 may manage the transfer of data communications for client devices, such as one or more UEs 115.

Inter-station communications manager 850 may manage communications with other base stations 105 and may include a controller or scheduler for controlling communications with UEs 115 in cooperation with other base stations 105. For example, the inter-station communications manager 850 may coordinate scheduling for transmissions to UEs 115 for various interference mitigation techniques such as beamforming or joint transmission. In some examples, inter-station communications manager 850 may provide an X2 interface within an LTE/LTE-A wireless communication network technology to provide communication between base stations 105.

Figure 9:
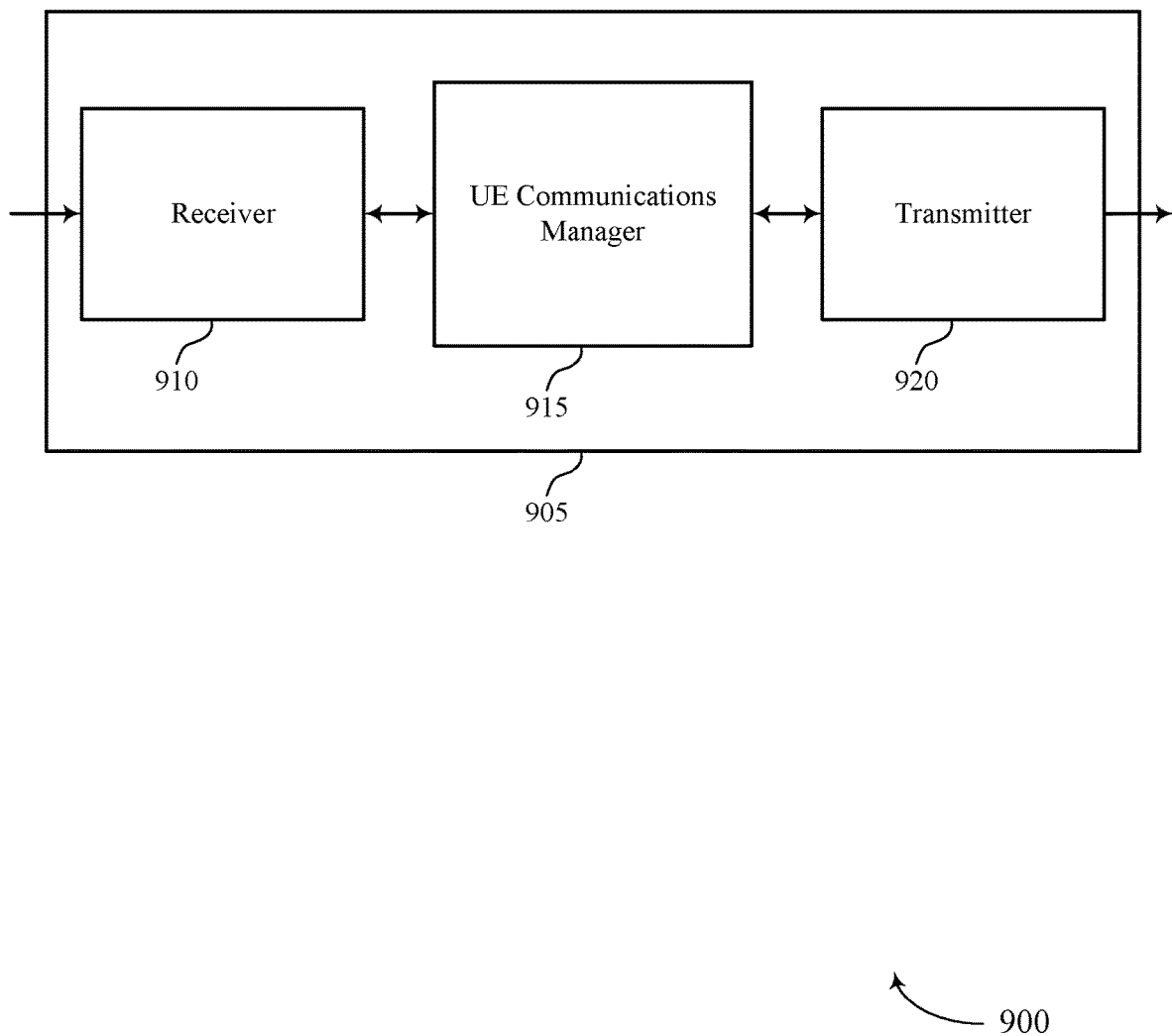
FIGS. 9 through 11 show block diagrams of a device that supports a channel availability protocol in a shared spectrum in accordance with aspects of the present disclosure.

FIG. 9 shows a block diagram 900 of a wireless device 905 that supports a channel availability protocol in a shared spectrum in accordance with aspects of the present disclosure. Wireless device 905 may be an example of aspects of a UE 115 or a receiver as described herein. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to channel availability protocol in a shared spectrum, etc.). Information may be passed on to other components of the device. The receiver 910 may be an example of aspects of the transceiver 1235 described with reference to FIG. 12. The receiver 910 may utilize a single antenna or a set of antennas.

UE communications manager 915 may be an example of aspects of the UE communications manager 1215 described with reference to FIG. 12.

UE communications manager 915 and/or at least some of its various sub-components may be implemented in hardware, software executed by a processor, firmware, or any combination thereof. If implemented in software executed by a processor, the functions of the UE communications manager 915 and/or at least some of its various sub-components may be executed by a general-purpose processor, a DSP, an ASIC, an FPGA or other PLD, discrete gate or transistor logic, discrete hardware components, or any combination thereof designed to perform the functions described in the present disclosure. The UE communications manager 915 and/or at least some of its various sub-components may be physically located at various positions, including being distributed such that portions of functions are implemented at different physical locations by one or more physical devices.

In some examples, UE communications manager 915 and/or at least some of its various sub-components may be a separate and distinct component in accordance with various aspects of the present disclosure. In other examples, UE communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 915 may receive a request message from a transmitter, where the request message includes a specified time to transmit a message. In some cases, UE communications manager 915 may measure a signal quality metric associated with the request message. Additionally, UE communications manager 915 may transmit the message at the specified time based on the signal quality metric measurement exceeding a request threshold associated with the request message. In some cases, UE communications manager 915 may then receive a data transmission from the transmitter in a shared frequency spectrum band in response to the transmitted message.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
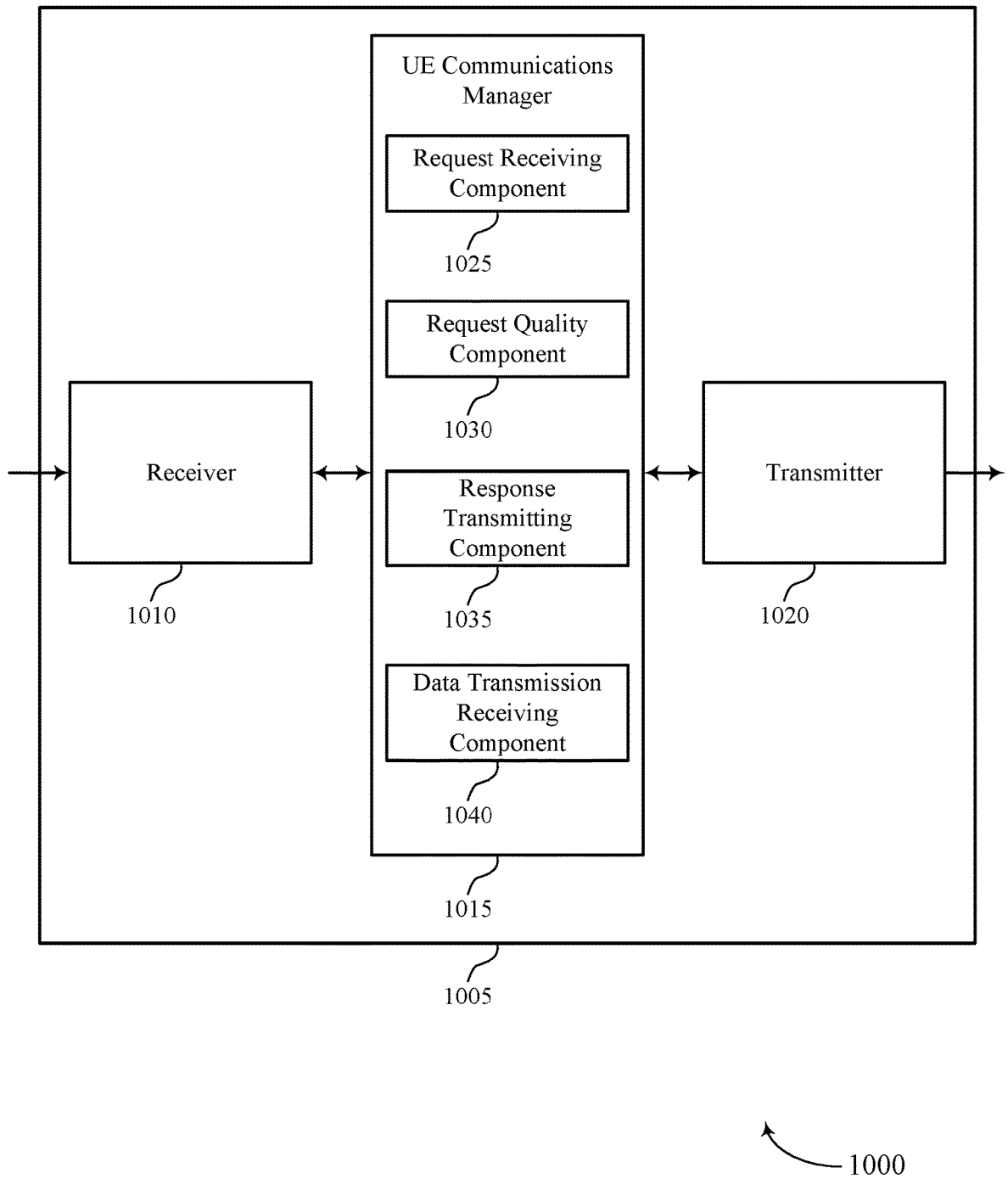

FIG. 10 shows a block diagram 1000 of a wireless device 1005 that supports a channel availability protocol in a shared spectrum in accordance with aspects of the present disclosure. Wireless device 1005 may be an example of aspects of a wireless device 905, a UE 115, or a receiver as described with reference to FIG. 9. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to channel availability protocol in a shared spectrum, etc.). Information may be passed on to other components of the device. The receiver 1010 may be an example of aspects of the transceiver 1235 described with reference to FIG. 12. The receiver 1010 may utilize a single antenna or a set of antennas.

UE communications manager 1015 may be an example of aspects of the UE communications manager 1215 described with reference to FIG. 12.

UE communications manager 1015 may also include request receiving component 1025, request quality component 1030, response transmitting component 1035, and data transmission receiving component 1040.

Request receiving component 1025 may receive a request message from a transmitter, where the request message includes a specified time to transmit a message.

Request quality component 1030 may measure a signal quality metric associated with the request message, where measuring the signal quality metric associated with the request message is independent of an energy detection. In some cases, the signal quality metric associated with the request message includes an SNR or an SINR associated with the request message.

Response transmitting component 1035 may transmit the message at the specified time based on the signal quality metric measurement exceeding a request threshold associated with the request message.

Data transmission receiving component 1040 may receive a data transmission from the transmitter in a shared frequency spectrum band in response to the transmitted message. In some cases, the data transmission is based on a measurement of a signal quality metric associated with the transmitted message.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
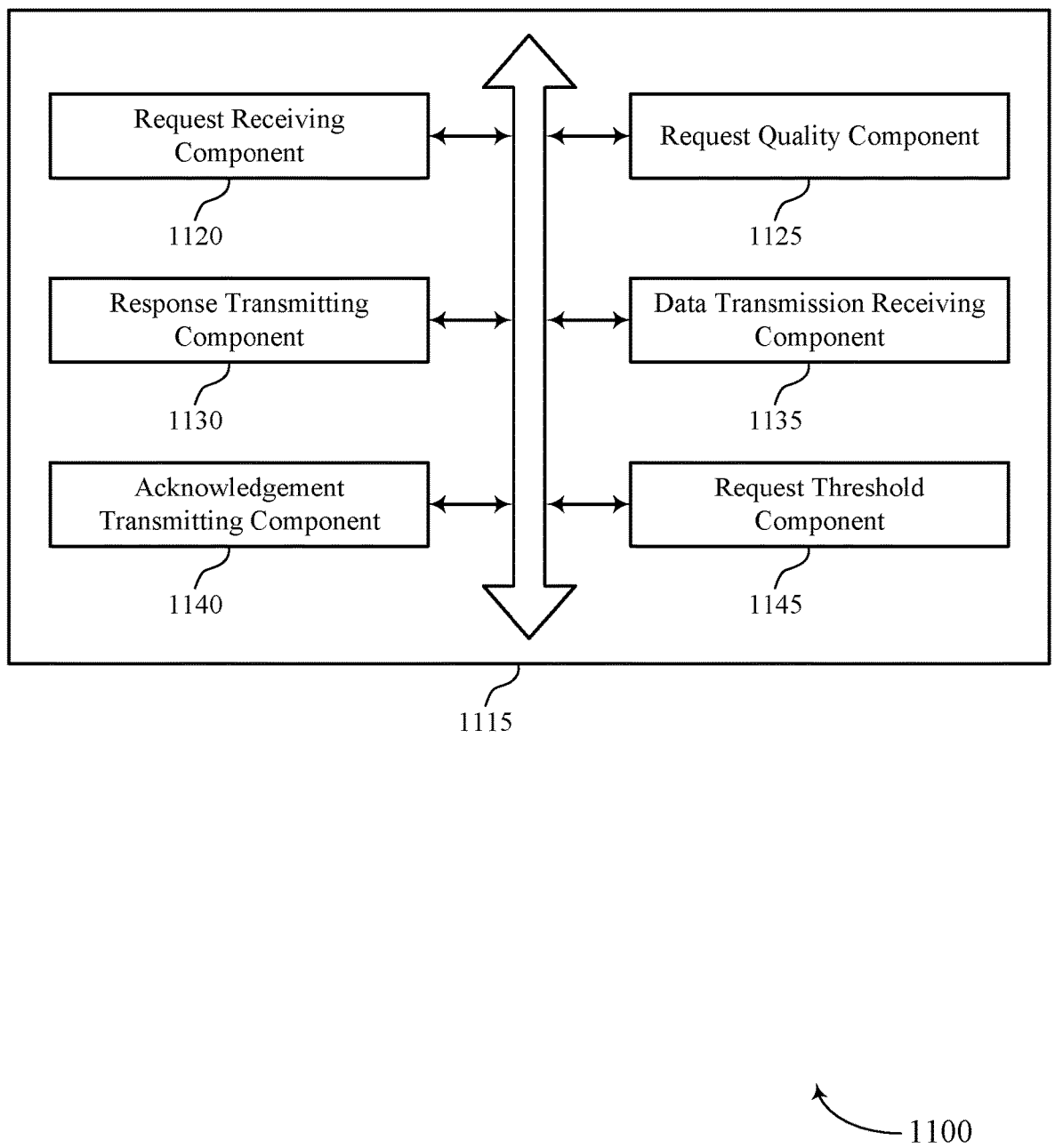

FIG. 11 shows a block diagram 1100 of a UE communications manager 1115 that supports a channel availability protocol in a shared spectrum in accordance with aspects of the present disclosure. The UE communications manager 1115 may be an example of aspects of a UE communications manager 1215 described with reference to FIGS. 9, 10, and 12. The UE communications manager 1115 may include request receiving component 1120, request quality component 1125, response transmitting component 1130, data transmission receiving component 1135, acknowledgement transmitting component 1140, and request threshold component 1145. Each of these modules may communicate, directly or indirectly, with one another (e.g., via one or more buses).

Request receiving component 1120 may receive a request message from a transmitter, where the request message includes a specified time to transmit a message.

Request quality component 1125 may measure a signal quality metric associated with the request message, where measuring the signal quality metric associated with the request message is independent of an energy detection. In some cases, the signal quality metric associated with the request message includes an SNR or an SINR associated with the request message.

Response transmitting component 1130 may transmit the message at the specified time based on the signal quality metric measurement exceeding a request threshold associated with the request message.

Data transmission receiving component 1135 may receive a data transmission from the transmitter in a shared frequency spectrum band in response to the transmitted message. In some cases, the data transmission is based on a measurement of a signal quality metric associated with the transmitted message.

Acknowledgement transmitting component 1140 may transmit one or more acknowledgement messages to the transmitter based on receiving the data transmission.

Request threshold component 1145 may receive the request threshold in the request message. In some cases, the request threshold is received via an RRC broadcast.

Figure 12:
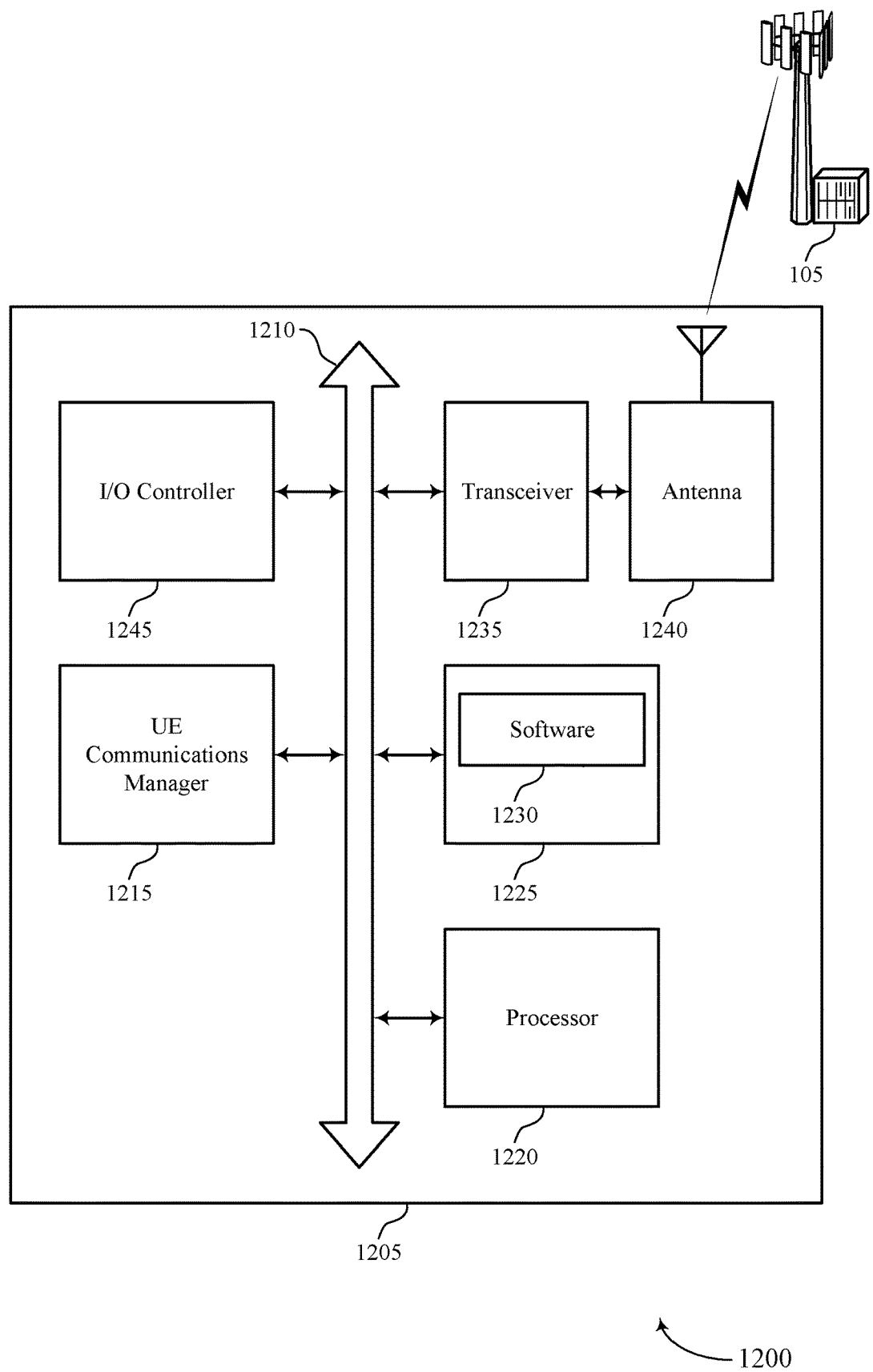
FIG. 12 illustrates a block diagram of a system including a UE that supports a channel availability protocol in a shared spectrum in accordance with aspects of the present disclosure.

FIG. 12 shows a diagram of a system 1200 including a device 1205 that supports a channel availability protocol in a shared spectrum in accordance with aspects of the present disclosure. Device 1205 may be an example of or include the components of UE 115 as described above, e.g., with reference to FIG. 1. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device (e.g., a general-purpose processor, a DSP, a CPU, a microcontroller, an ASIC, an FPGA, a PLD, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting channel availability protocol in a shared spectrum).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support channel availability protocol in a shared spectrum. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
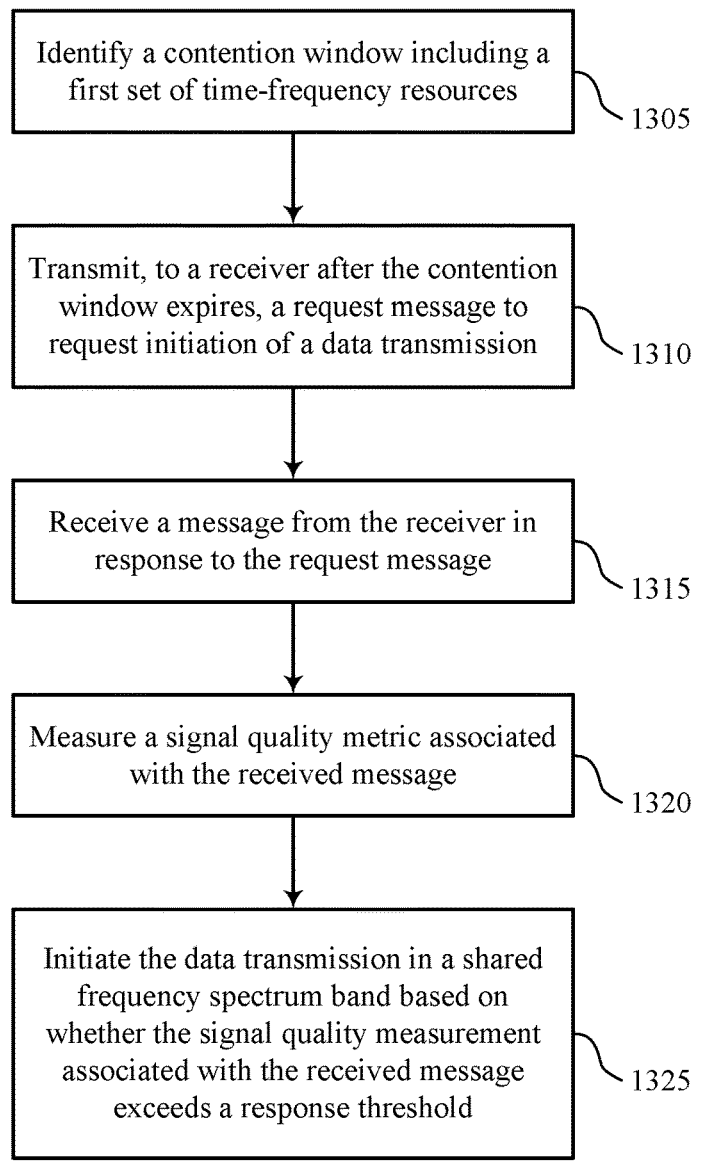
FIGS. 13 through 18 illustrate methods for a channel availability protocol in a shared spectrum in accordance with aspects of the present disclosure.

FIG. 13 shows a flowchart illustrating a method 1300 for channel availability protocol in a shared spectrum in accordance with aspects of the present disclosure. The operations of method 1300 may be implemented by a base station 105 or its components as described herein. For example, the operations of method 1300 may be performed by a base station communications manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At 1305 the base station 105 may identify a contention window including a first set of time-frequency resources. The operations of 1305 may be performed according to the methods described herein. In certain examples, aspects of the operations of 1305 may be performed by a contention window component as described with reference to FIGS. 5 through 8.

At 1310 the base station 105 may transmit, to a receiver after the contention window expires, a request message to request initiation of a data transmission. The operations of 1310 may be performed according to the methods described herein. In certain examples, aspects of the operations of 1310 may be performed by a request message component as described with reference to FIGS. 5 through 8.

At 1315 the base station 105 may receive a message from the receiver in response to the request message. The operations of 1315 may be performed according to the methods described herein. In certain examples, aspects of the operations of 1315 may be performed by a response message component as described with reference to FIGS. 5 through 8.

At 1320 the base station 105 may measure a signal quality metric associated with the received message. The operations of 1320 may be performed according to the methods described herein. In certain examples, aspects of the operations of 1320 may be performed by a signal quality component as described with reference to FIGS. 5 through 8.

At 1325 the base station 105 may initiate the data transmission in a shared frequency spectrum band based on whether the signal quality metric measurement associated with the received message exceeds a response threshold. The operations of 1325 may be performed according to the methods described herein. In certain examples, aspects of the operations of 1325 may be performed by a data transmission component as described with reference to FIGS. 5 through 8.

Figure 14:
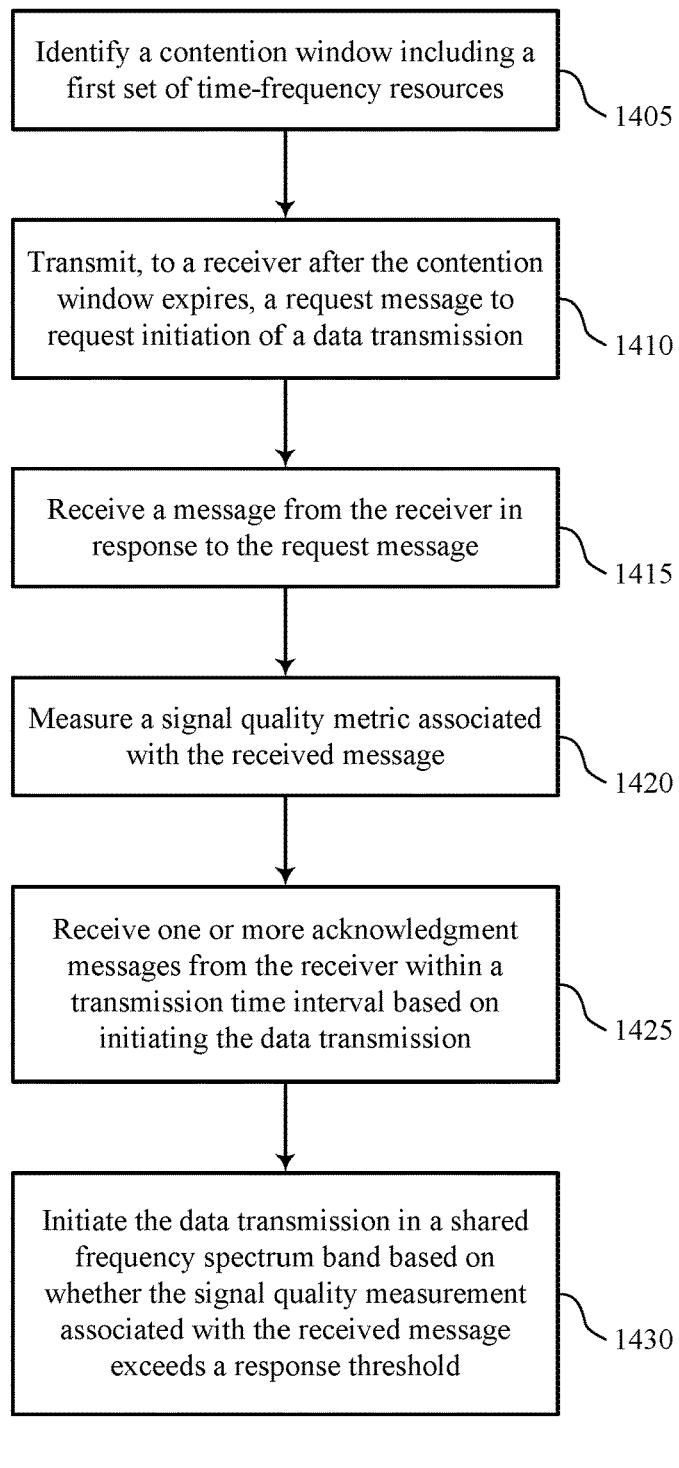

FIG. 14 shows a flowchart illustrating a method 1400 for channel availability protocol in a shared spectrum in accordance with aspects of the present disclosure. The operations of method 1400 may be implemented by a base station 105 or its components as described herein. For example, the operations of method 1400 may be performed by a base station communications manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At 1405 the base station 105 may identify a contention window including a first set of time-frequency resources. The operations of 1405 may be performed according to the methods described herein. In certain examples, aspects of the operations of 1405 may be performed by a contention window component as described with reference to FIGS. 5 through 8.

At 1410 the base station 105 may transmit, to a receiver after the contention window expires, a request message to request initiation of a data transmission. The operations of 1410 may be performed according to the methods described herein. In certain examples, aspects of the operations of 1410 may be performed by a request message component as described with reference to FIGS. 5 through 8.

At 1415 the base station 105 may receive a message from the receiver in response to the request message. The operations of 1415 may be performed according to the methods described herein. In certain examples, aspects of the operations of 1415 may be performed by a response message component as described with reference to FIGS. 5 through 8.

At 1420 the base station 105 may measure a signal quality metric associated with the received message. The operations of 1420 may be performed according to the methods described herein. In certain examples, aspects of the operations of 1420 may be performed by a signal quality component as described with reference to FIGS. 5 through 8.

At 1425 the base station 105 may receive one or more acknowledgment messages from the receiver within a transmission time interval based on initiating the data transmission. The operations of 1425 may be performed according to the methods described herein. In certain examples, aspects of the operations of 1425 may be performed by an acknowledgement message component as described with reference to FIGS. 5 through 8.

At 1430 the base station 105 may initiate the data transmission in a shared frequency spectrum band based on whether the signal quality metric measurement associated with the received message exceeds a response threshold. The operations of 1430 may be performed according to the methods described herein. In certain examples, aspects of the operations of 1430 may be performed by a data transmission component as described with reference to FIGS. 5 through 8.

Figure 15:
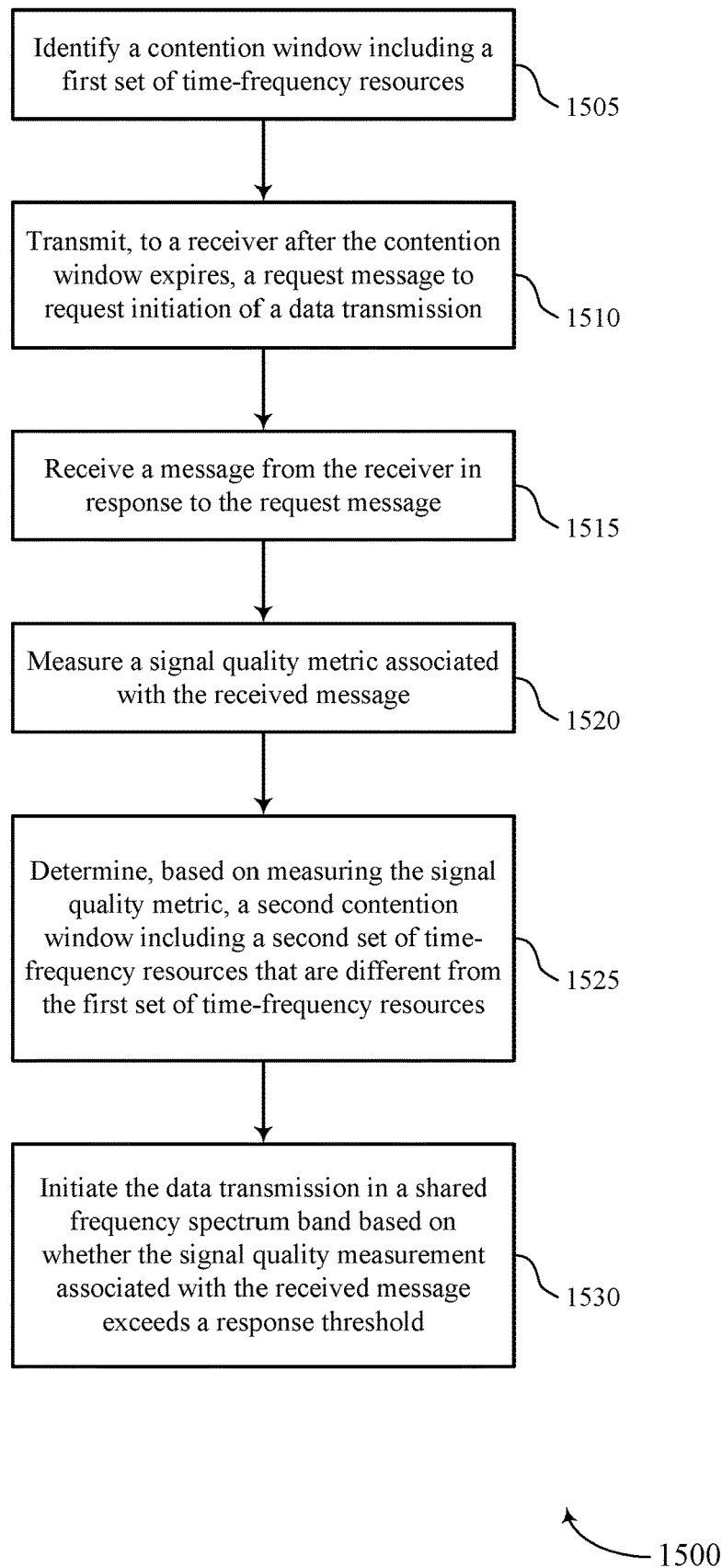

FIG. 15 shows a flowchart illustrating a method 1500 for channel availability protocol in a shared spectrum in accordance with aspects of the present disclosure. The operations of method 1500 may be implemented by a base station 105 or its components as described herein. For example, the operations of method 1500 may be performed by a base station communications manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At 1505 the base station 105 may identify a contention window including a first set of time-frequency resources. The operations of 1505 may be performed according to the methods described herein. In certain examples, aspects of the operations of 1505 may be performed by a contention window component as described with reference to FIGS. 5 through 8.

At 1510 the base station 105 may transmit, to a receiver after the contention window expires, a request message to request initiation of a data transmission. The operations of 1510 may be performed according to the methods described herein. In certain examples, aspects of the operations of 1510 may be performed by a request message component as described with reference to FIGS. 5 through 8.

At 1515 the base station 105 may receive a message from the receiver in response to the request message. The operations of 1515 may be performed according to the methods described herein. In certain examples, aspects of the operations of 1515 may be performed by a response message component as described with reference to FIGS. 5 through 8.

At 1520 the base station 105 may measure a signal quality metric associated with the received message. The operations of 1520 may be performed according to the methods described herein. In certain examples, aspects of the operations of 1520 may be performed by a signal quality component as described with reference to FIGS. 5 through 8.

At 1525 the base station 105 may determine, based on measuring the signal quality metric, a second contention window including a second set of time-frequency resources that are different from the first set of time-frequency resources. The operations of 1525 may be performed according to the methods described herein. In certain examples, aspects of the operations of 1525 may be performed by an additional contention window component as described with reference to FIGS. 5 through 8.

At 1530 the base station 105 may initiate the data transmission in a shared frequency spectrum band based on whether the signal quality metric measurement associated with the received message exceeds a response threshold. The operations of 1530 may be performed according to the methods described herein. In certain examples, aspects of the operations of 1530 may be performed by a data transmission component as described with reference to FIGS. 5 through 8.

Figure 16:
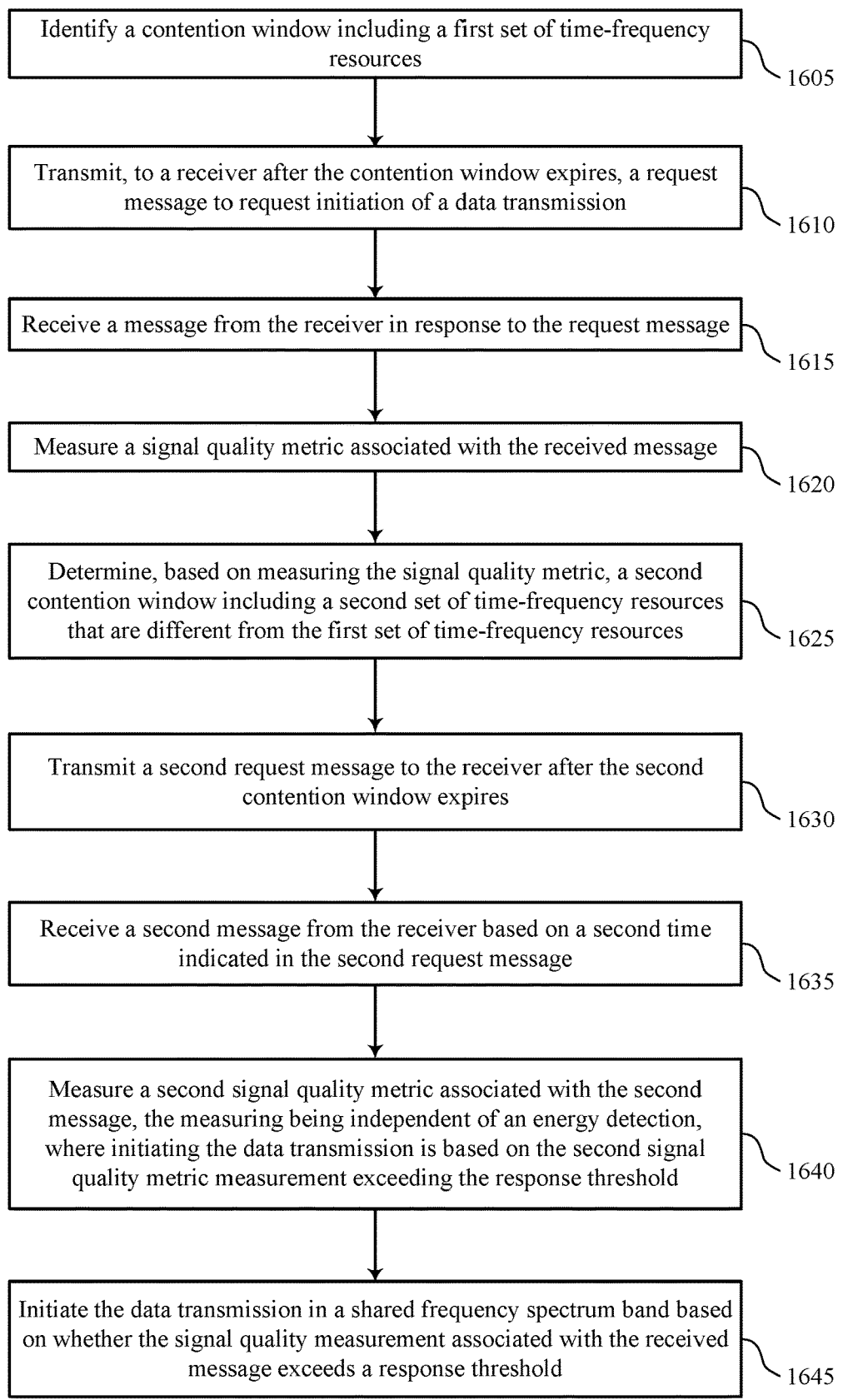

FIG. 16 shows a flowchart illustrating a method 1600 for channel availability protocol in a shared spectrum in accordance with aspects of the present disclosure. The operations of method 1600 may be implemented by a base station 105 or its components as described herein. For example, the operations of method 1600 may be performed by a base station communications manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may identify a contention window including a first set of time-frequency resources. The operations of 1605 may be performed according to the methods described herein. In certain examples, aspects of the operations of 1605 may be performed by a contention window component as described with reference to FIGS. 5 through 8.

At 1610 the base station 105 may transmit, to a receiver after the contention window expires, a request message to request initiation of a data transmission. The operations of 1610 may be performed according to the methods described herein. In certain examples, aspects of the operations of 1610 may be performed by a request message component as described with reference to FIGS. 5 through 8.

At 1615 the base station 105 may receive a message from the receiver in response to the request message. The operations of 1615 may be performed according to the methods described herein. In certain examples, aspects of the operations of 1615 may be performed by a response message component as described with reference to FIGS. 5 through 8.

At 1620 the base station 105 may measure a signal quality metric associated with the received message. The operations of 1620 may be performed according to the methods described herein. In certain examples, aspects of the operations of 1620 may be performed by a signal quality component as described with reference to FIGS. 5 through 8.

At 1625 the base station 105 may determine, based on measuring the signal quality metric, a second contention window including a second set of time-frequency resources that are different from the first set of time-frequency resources. The operations of 1625 may be performed according to the methods described herein. In certain examples, aspects of the operations of 1625 may be performed by an additional contention window component as described with reference to FIGS. 5 through 8.

At 1630 the base station 105 may transmit a second request message to the receiver after the second contention window expires. The operations of 1630 may be performed according to the methods described herein. In certain examples, aspects of the operations of 1630 may be performed by an additional request message component as described with reference to FIGS. 5 through 8.

At 1635 the base station 105 may receive a second message from the receiver based on a second time indicated in the second request message. The operations of 1635 may be performed according to the methods described herein. In certain examples, aspects of the operations of 1635 may be performed by an additional response message component as described with reference to FIGS. 5 through 8.

At 1640 the base station 105 may measure a second signal quality metric associated with the second message, the measuring being independent of an energy detection, where initiating the data transmission is based on the second signal quality metric measurement exceeding the response threshold. The operations of 1640 may be performed according to the methods described herein. In certain examples, aspects of the operations of 1640 may be performed by an additional signal quality component as described with reference to FIGS. 5 through 8.

At 1645 the base station 105 may initiate the data transmission in a shared frequency spectrum band based on whether the signal quality metric measurement associated with the received message exceeds a response threshold. The operations of 1645 may be performed according to the methods described herein. In certain examples, aspects of the operations of 1645 may be performed by a data transmission component as described with reference to FIGS. 5 through 8.

Figure 17:
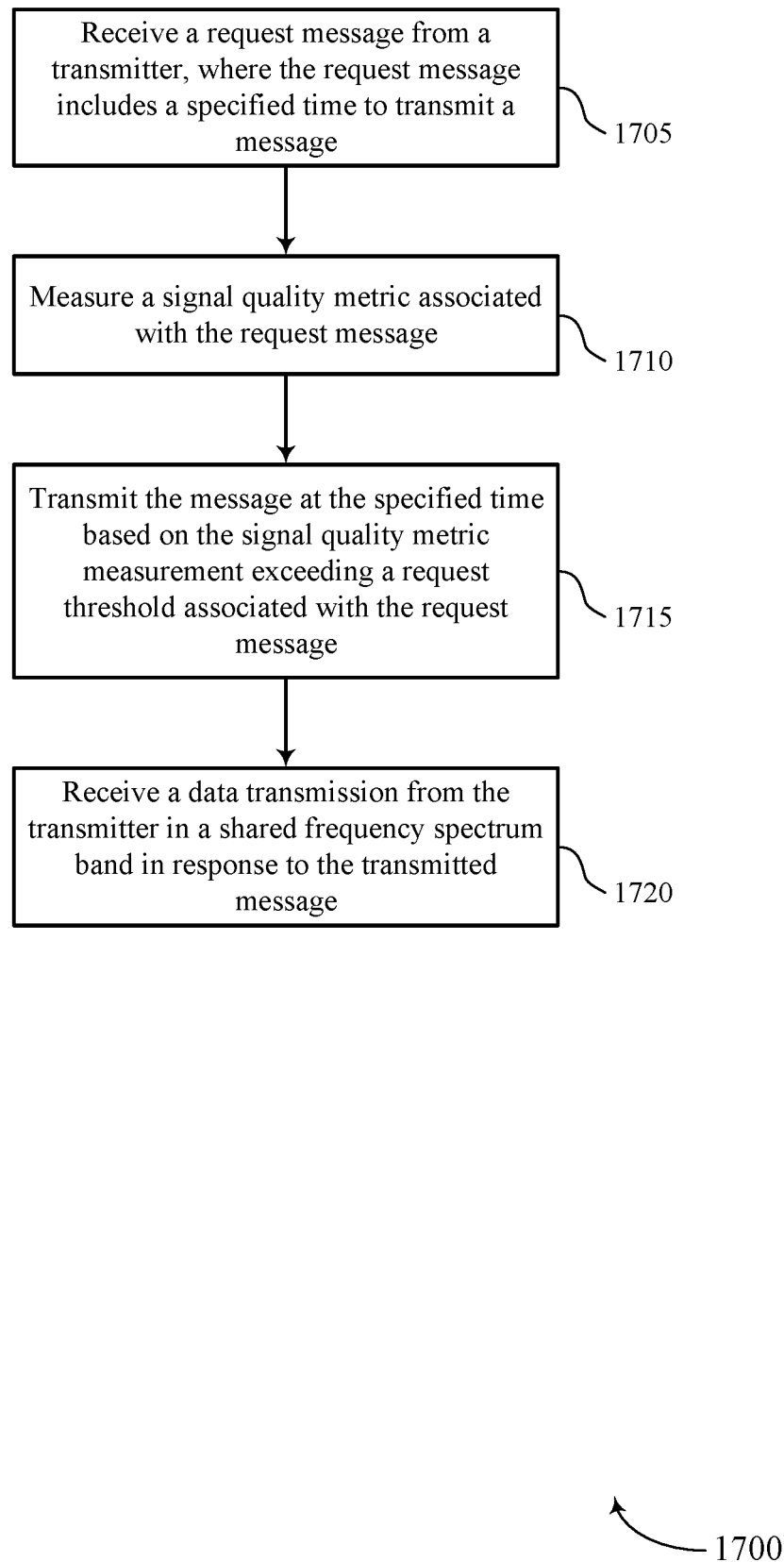

FIG. 17 shows a flowchart illustrating a method 1700 for channel availability protocol in a shared spectrum in accordance with aspects of the present disclosure. The operations of method 1700 may be implemented by a UE 115 or its components as described herein. For example, the operations of method 1700 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 1705 the UE 115 may receive a request message from a transmitter, where the request message includes a specified time to transmit a message. The operations of 1705 may be performed according to the methods described herein. In certain examples, aspects of the operations of 1705 may be performed by a request receiving component as described with reference to FIGS. 9 through 12.

At 1710 the UE 115 may measure a signal quality metric associated with the request message. The operations of 1710 may be performed according to the methods described herein. In certain examples, aspects of the operations of 1710 may be performed by a request quality component as described with reference to FIGS. 9 through 12.

At 1715 the UE 115 may transmit the message at the specified time based on the signal quality metric measurement exceeding a request threshold associated with the request message. The operations of 1715 may be performed according to the methods described herein. In certain examples, aspects of the operations of 1715 may be performed by a response transmitting component as described with reference to FIGS. 9 through 12.

At 1720 the UE 115 may receive a data transmission from the transmitter in a shared frequency spectrum band in response to the transmitted message. The operations of 1720 may be performed according to the methods described herein. In certain examples, aspects of the operations of 1720 may be performed by a data transmission receiving component as described with reference to FIGS. 9 through 12.

Figure 18:
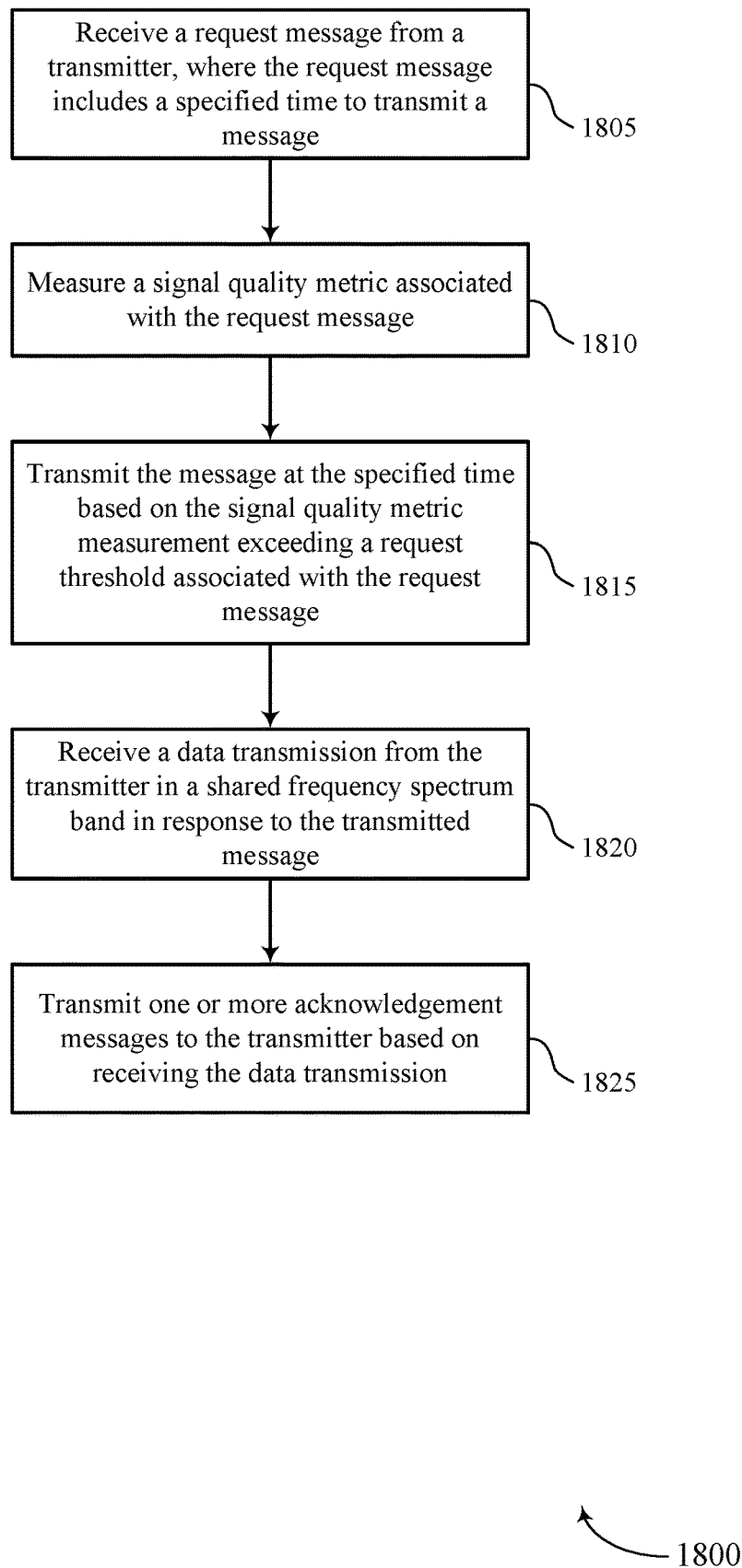

FIG. 18 shows a flowchart illustrating a method 1800 for channel availability protocol in a shared spectrum in accordance with aspects of the present disclosure. The operations of method 1800 may be implemented by a UE 115 or its components as described herein. For example, the operations of method 1800 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 1805 the UE 115 may receive a request message from a transmitter, where the request message includes a specified time to transmit a message. The operations of 1805 may be performed according to the methods described herein. In certain examples, aspects of the operations of 1805 may be performed by a request receiving component as described with reference to FIGS. 9 through 12.

At 1810 the UE 115 may measure a signal quality metric associated with the request message. The operations of 1810 may be performed according to the methods described herein. In certain examples, aspects of the operations of 1810 may be performed by a request quality component as described with reference to FIGS. 9 through 12.

At 1815 the UE 115 may transmit the message at the specified time based on the signal quality metric measurement exceeding a request threshold associated with the request message. The operations of 1815 may be performed according to the methods described herein. In certain examples, aspects of the operations of 1815 may be performed by a response transmitting component as described with reference to FIGS. 9 through 12.

At 1820 the UE 115 may receive a data transmission from the transmitter in a shared frequency spectrum band in response to the transmitted message. The operations of 1820 may be performed according to the methods described herein. In certain examples, aspects of the operations of 1820 may be performed by a data transmission receiving component as described with reference to FIGS. 9 through 12.

At 1825 the UE 115 may transmit one or more acknowledgement messages to the transmitter based on receiving the data transmission. The operations of 1825 may be performed according to the methods described herein. In certain examples, aspects of the operations of 1825 may be performed by an acknowledgement transmitting component as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a transmitter, comprising:
   identifying a contention window comprising a first set of time-frequency resources;
   transmitting, to a receiver after the contention window expires, a request message to request initiation of a data transmission, the request message comprising an indication of a time of transmission from the receiver for a response message, a request threshold associated with the request message, and an indication of a response threshold;
   receiving the response message from the receiver in response to the request message based at least in part on the time for receiving the response message and the request threshold;
   measuring a signal to noise quality metric associated with the response message; and
   initiating the data transmission in a shared frequency spectrum band based at least in part on whether the signal to noise quality metric measurement associated with the response message exceeds the response threshold.

2. The method of claim 1, further comprising:
   receiving one or more acknowledgment messages from the receiver within a transmission time interval based at least in part on initiating the data transmission.

3. The method of claim 1, wherein receiving the response message from the receiver in response to the request message further comprises:
   waiting for the response message from the receiver at the time indicated in the request message.

4. The method of claim 1, further comprising:
   setting the contention window to the first set of time-frequency resources based at least in part on receiving satisfactory one or more acknowledgement messages from the receiver within a transmission time interval, the satisfactory one or more acknowledgement messages comprising an indication that an amount of code blocks for the initiated data transmission have been correctly checked within the transmission time interval.

5. The method of claim 1, wherein the response message from the receiver is based at least in part on a measurement of an additional signal to noise quality metric associated with the request message.

6. The method of claim 1, further comprising:
   determining, based at least in part on measuring the signal to noise quality metric, a second contention window comprising a second set of time-frequency resources that are different from the first set of time-frequency resources.

7. The method of claim 6, wherein a first size of the contention window and a second size of the second contention window are of a same size, the method further comprising:
   determining that one or more acknowledgement messages received from the receiver within a transmission time interval are satisfactory, the satisfactory one or more acknowledgement messages comprising an indication that an amount of code blocks for the initiated data transmission have been correctly checked within the transmission time interval wherein determining the second contention window is based at least in part on determining that the satisfactory one or more acknowledgement messages have been received; and
   transmitting an additional request to the receiver using the second set of time-frequency resources based at least in part on determining that the satisfactory one or more acknowledgment messages have been received.

8. The method of claim 6, further comprising:
   determining that the signal to noise quality metric measurement does not exceed the response threshold or that the transmitter failed to receive the response message from the receiver based at least in part on the time indicated in the request message, wherein determining the second contention window is based at least in part on determining that the signal to noise quality metric measurement does not exceed the response threshold or that the transmitter failed to receive the response message.

9. The method of claim 6, further comprising:
   determining that one or more acknowledgement messages received from the receiver within a transmission time interval are not satisfactory, the not satisfactory one or more acknowledgement messages comprising an indication that an amount of code blocks for the initiated data transmission have not been correctly checked within the transmission time interval, wherein determining the second contention window is based at least in part on determining that the not satisfactory one or more acknowledgment messages have been received from the receiver.

10. The method of claim 6, wherein the second set of time-frequency resources comprises a second number of time resources, the second number of time resources being greater than a first number of time resources in the first set of time-frequency resources.

11. The method of claim 10, further comprising:
    determining that the second set of time-frequency resources has not reached a maximum contention window time value; and
    determining a third contention window comprising a third set of times frequency resources with a third number of time resources that is greater than the second number of time resources of the second set of time-frequency resources based at least in part on determining that the second set of time-frequency resources has not reached the maximum contention window time value.

12. The method of claim 6, further comprising:
    transmitting a second request message to the receiver after the second contention window expires;
    receiving a second response message from the receiver based at least in part on a second time indicated in the second request message; and
    measuring a second signal to noise quality metric associated with the second response message, the measuring being independent of an energy detection, wherein initiating the data transmission is based at least in part on the second signal to noise quality metric measurement exceeding the response threshold.

13. The method of claim 12, wherein the second request message comprises a second request initiation for the data transmission and an indication of frequency resources to be used for the data transmission, the frequency resources being fewer than an indication of frequency resources associated with the request message.

14. The method of claim 6, further comprising:
transmitting the request message to a second receiver different from the receiver after transmitting the request message to the receiver.

15. The method of claim 1, wherein the request message comprises an identification of the receiver.

16. The method of claim 15, wherein the request message comprises one length of a transmission time interval.

17. The method of claim 15, wherein the request message is transmitted on a physical downlink control channel.

18. The method of claim 1, wherein the request message comprises an indication of time-frequency resources for the data transmission.

19. The method of claim 1, further comprising:
measuring the signal to noise quality metric associated with the response message independent of an energy detection associated with the receiver.

20. The method of claim 1, wherein the signal to noise quality metric associated with the response message comprises a signal-to-noise ratio or a signal-to-interference-plus-noise ratio associated with the response message.

21. An apparatus for wireless communication, comprising:
a processor;
memory in electronic communication with the processor; and
instructions stored in the memory and executable by the processor to cause the apparatus to:
identify a contention window comprising a first set of time-frequency resources;
transmit, to a receiver after the contention window expires, a request message to request initiation of a data transmission, the request message comprising an indication of a time of transmission from the receiver for a response message, a request threshold associated with the request message, and an indication of a response threshold;
receive the response message from the receiver in response to the request message based at least in part on the time for receiving the response message and the request threshold;
measure a signal to noise quality metric associated with the response message; and
initiate the data transmission in a shared frequency spectrum band based at least in part on whether the signal to noise quality metric measurement associated with the response message exceeds the response threshold.

22. The apparatus of claim 21, wherein the instructions are further executable by the processor to cause the apparatus to:
set the contention window to the first set of time-frequency resources based at least in part on receiving satisfactory one or more acknowledgement messages from the receiver within a transmission time interval, the satisfactory one or more acknowledgement messages comprising an indication that an amount of code blocks for the initiated data transmission have been correctly checked within the transmission time interval.

23. The apparatus of claim 21, wherein the instructions are further executable by the processor to cause the apparatus to:
determine, based at least in part on measuring the signal to noise quality metric, a second contention window comprising a second set of time-frequency resources that are different from the first set of time-frequency resources.

* * * * *